(12) United States Patent
Pantalone et al.

(10) Patent No.: US 10,604,245 B2
(45) Date of Patent: Mar. 31, 2020

(54) ROTOR UNITS HAVING ASYMMETRIC ROTOR BLADES

(71) Applicant: Wing Aviation LLC, Mountain View, CA (US)

(72) Inventors: Giulia Pantalone, San Francisco, CA (US); Adam Woodworth, Santa Clara, CA (US)

(73) Assignee: Wing Aviation LLC, Mountain View, CA (US)

( * ) Notice: Subject to any disclaimer, the term of this patent is extended or adjusted under 35 U.S.C. 154(b) by 604 days.

(21) Appl. No.: 15/396,399

(22) Filed: Dec. 30, 2016

(65) Prior Publication Data

US 2018/0186448 A1  Jul. 5, 2018

(51) Int. Cl.
| | | |
|---|---|---|
| *B64C 27/46* | (2006.01) | |
| *B64C 27/467* | (2006.01) | |
| *B64C 39/02* | (2006.01) | |
| *B64C 27/08* | (2006.01) | |
| *B64C 27/32* | (2006.01) | |

(52) U.S. Cl.
CPC ............ *B64C 27/463* (2013.01); *B64C 27/08* (2013.01); *B64C 27/467* (2013.01); *B64C 39/024* (2013.01); *B64C 27/32* (2013.01); *B64C 2201/021* (2013.01); *B64C 2201/104* (2013.01); *B64C 2201/108* (2013.01); *B64C 2230/14* (2013.01)

(58) Field of Classification Search
CPC . B64C 27/08; B64C 2201/108; B64C 27/463; B64C 27/467; B64C 2230/28
See application file for complete search history.

(56) References Cited

U.S. PATENT DOCUMENTS

| | | |
|---|---|---|
| 5,096,383 A | 3/1992 | Dobrzynski |
| 5,620,303 A | 4/1997 | Moffitt et al. |
| (Continued) | | |

OTHER PUBLICATIONS

International Search Report and Written Opinion prepared by the Korean Patent Office in International Application Serial No. PCT/US2017/066802, dated Apr. 5, 2018.

(Continued)

*Primary Examiner* — Phutthiwat Wongwian
*Assistant Examiner* — Arnold Castro
(74) *Attorney, Agent, or Firm* — McDonnell Boehnen Hulbert & Berghoff LLP

(57) ABSTRACT

An aerial vehicle is provided including rotor units connected to the aerial vehicle, and a control system configured to operate at least one of the rotor units. The rotor unit includes rotor blades, wherein each rotor blade includes a surface area, and wherein an asymmetric parameter is defined, at least in part, by the relationship between the surface areas of the rotor blades. The value of the asymmetric parameter is selected such that the operation of the rotor unit: (i) moves the rotor blades such that each rotor blade produces a respective vortex and (ii) the respective vortices cause the rotor unit to produce a sound output having an energy distribution defined, at least in part, by a set of frequencies, wherein the set of frequencies includes a fundamental frequency, one or more harmonic frequencies, and one or more non-harmonic frequencies having a respective strength greater than a threshold strength.

20 Claims, 19 Drawing Sheets

(56) References Cited

U.S. PATENT DOCUMENTS

| | | | | |
|---|---|---|---|---|
| 5,927,656 | A * | 7/1999 | Hinkleman | B64C 9/24 244/203 |
| 7,488,155 | B2 * | 2/2009 | Barbu | F03D 7/0224 416/1 |
| 8,608,441 | B2 * | 12/2013 | Hotto | F03D 1/0608 416/42 |
| 2003/0230898 | A1 * | 12/2003 | Jamieson | F03D 7/0236 290/55 |
| 2005/0287885 | A1 * | 12/2005 | Mizuguchi | B63H 20/32 440/76 |
| 2009/0226314 | A1 | 9/2009 | Bogrash | |
| 2011/0229300 | A1 * | 9/2011 | Kanev | F03D 7/0224 415/1 |
| 2012/0025016 | A1 | 2/2012 | Methven et al. | |
| 2013/0115083 | A1 | 5/2013 | Vuillemin | |
| 2014/0064968 | A1 | 3/2014 | Negulescu et al. | |
| 2015/0056058 | A1 | 2/2015 | Grissom et al. | |
| 2015/0147181 | A1 | 5/2015 | Henze et al. | |
| 2015/0344127 | A1 | 12/2015 | Wood et al. | |
| 2016/0169198 | A1 | 6/2016 | Hotto | |

OTHER PUBLICATIONS

Brocklehurst et al., "A review of helicopter rotor blade tip shapes", Progress in Aerospace Sciences, 56 (2013) pp. 35-74.

* cited by examiner

ROTOR UNITS HAVING ASYMMETRIC ROTOR BLADES

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Embodiments described herein relate to UAV rotor units having asymmetric rotor blades, where the asymmetric parameters of the rotor blades are such that the rotor unit's sound output has a desired frequency content, as well as methodologies for selecting such asymmetric parameters. Beneficially, humans may perceive the sound output of rotor units having asymmetric rotor blades according to example embodiments more favorably than the sound output of rotor units having symmetric rotor blades.

In one aspect, an aerial vehicle is provided, including a plurality of rotor units connected to the aerial vehicle, wherein at least one rotor unit of the plurality of rotor units includes two or more rotor blades, wherein each rotor blade of the two or more rotor blades includes a surface area, and wherein an asymmetric parameter is defined, at least in part, by the relationship between the surface areas of the two or more rotor blades; and a control system configured to operate the at least one rotor unit, wherein the value of the asymmetric parameter is selected such that the operation of the at least one rotor unit: (i) moves the two or more rotor blades such that each rotor blade produces a respective vortex and (ii) the respective vortices produced by the two or more rotor blades cause the rotor unit to produce a sound output having an energy distribution defined, at least in part, by a set of frequencies, wherein the set of frequencies includes a fundamental frequency, one or more harmonic frequencies of the fundamental frequency, and one or more non-harmonic frequencies of the fundamental frequency having a respective strength greater than a threshold strength.

In another aspect, a rotor unit is provided, including a motor; a hub coupled to the motor; and two or more rotor blades coupled to the hub, wherein each rotor blade of the two or more rotor blades includes a surface area, wherein an asymmetric parameter is defined, at least in part, by the relationship between the surface areas of the two or more rotor blades, wherein the value of the asymmetric parameter is selected such that operation of the rotor unit: (i) moves the two or more rotor blades such that each rotor blade produces a respective vortex and (ii) the respective vortices produced by the two or more rotor blades cause the rotor unit to produce a sound output having an energy distribution defined, at least in part, by a set of frequencies, wherein the set of frequencies includes a fundamental frequency, one or more harmonic frequencies of the fundamental frequency, and one or more non-harmonic frequencies of the fundamental frequency having a respective strength greater than a threshold strength.

In yet another aspect, a method is provided, including selecting a plurality of rotor units, wherein at least one rotor unit of the plurality of rotor units includes two or more rotor blades, wherein each rotor blade of the two or more rotor blades includes a surface area, and wherein an asymmetric parameter is defined, at least in part, by the relationship between the surface areas of the two or more rotor blades; and selecting the value of the asymmetric parameter such that operation of the at least one rotor unit: (i) moves the two or more rotor blades such that each rotor blade produces a respective vortex and (ii) the respective vortices produced by the two or more rotor blades cause the rotor unit to produce a sound output having an energy distribution defined, at least in part, by a set of frequencies, wherein the set of frequencies includes a fundamental frequency, one or more harmonic frequencies of the fundamental frequency, and one or more non-harmonic frequencies having a respective strength greater than a threshold strength.

In yet another aspect, a system includes means for selecting a plurality of rotor units, wherein at least one rotor unit of the plurality of rotor units includes two or more rotor blades, wherein each rotor blade of the two or more rotor blades includes a surface area, and wherein an asymmetric parameter is defined, at least in part, by the relationship between the surface area of the two or more rotor blades; and means for selecting the value of the asymmetric parameter such that operation of the at least one rotor unit: (i) moves the two or more rotor blades such that each rotor blade produces a respective vortex and (ii) the respective vortices produced by the two or more rotor blades cause the rotor unit to produce a sound output having an energy distribution defined, at least in part, by a set of frequencies, wherein the set of frequencies includes a fundamental frequency, one or more harmonic frequencies of the fundamental frequency, and one or more non-harmonic frequencies of the fundamental frequency having a respective strength greater than a threshold strength.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1A:
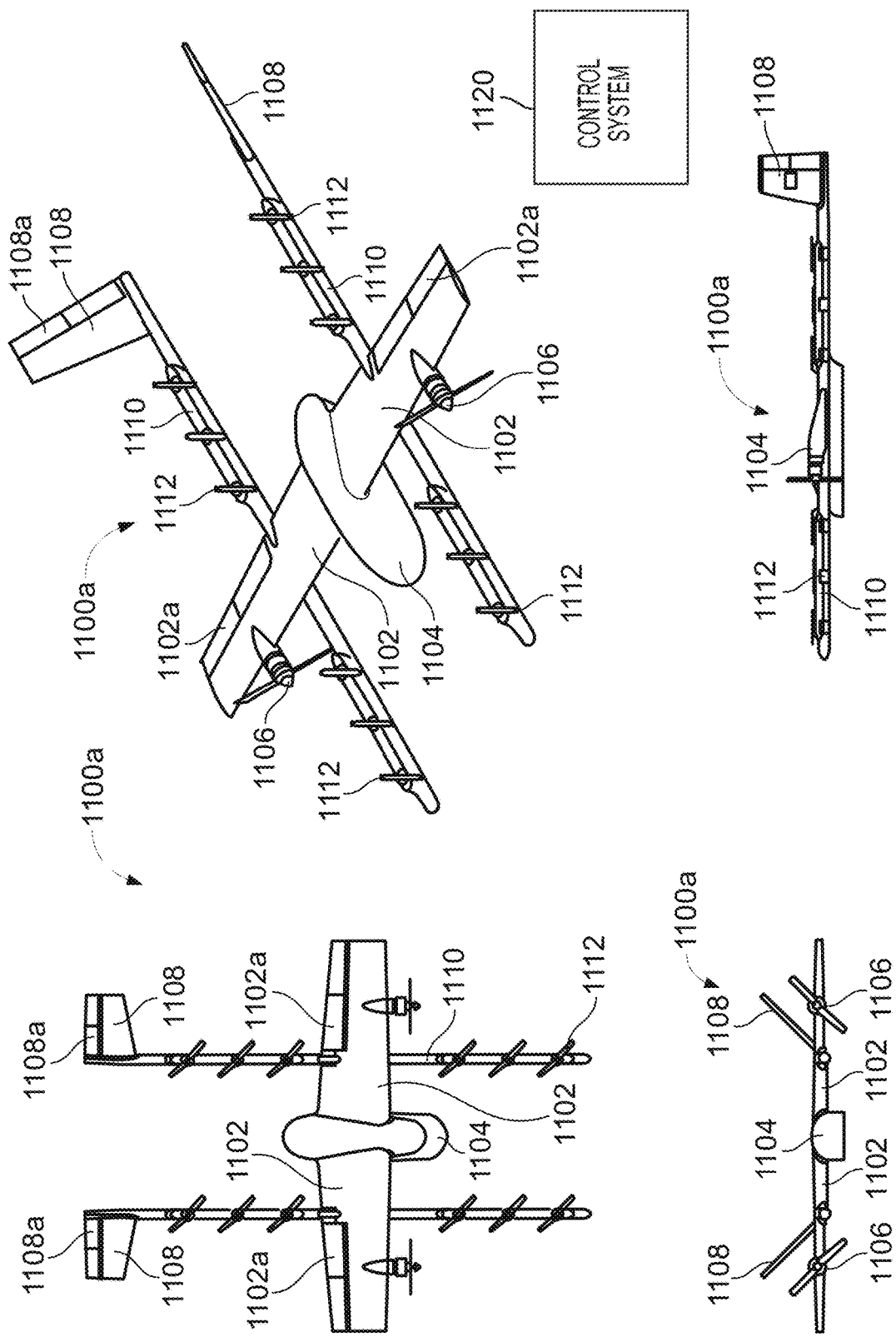
FIG. 1A is a simplified illustration of an unmanned aerial vehicle, according to an example embodiment.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. OVERVIEW

Exemplary embodiments may be implemented in or take of the form of an aerial vehicle; for example, an unmanned aerial vehicle (UAV). In example embodiments, a UAV may include rotor units operable to provide thrust or lift for the UAV for transport and delivery of the payload.

During flight, the UAV's rotor units may produce a sound output (e.g., noise) that may be perceived by humans. In an exemplary arrangement, a rotor unit's sound output may have an energy distribution defined, at least in part, by a set of frequencies (e.g., tones). Each frequency in the set of frequencies may have a strength that reflects the portion of the energy at the frequency. The strength of a frequency may refer to a sound pressure level dB(A) of the frequency. The set of frequencies and the strength of each frequency may be referred to as frequency content.

In various applications, a UAV may be used to transport and deliver a payload from a source location to a target location. For instance, a person may purchase merchandise or place a food order via an online vendor, and a UAV may deliver the purchased merchandise or food to the person. Such UAV delivery systems may allow for rapid delivery by avoiding delays caused by traffic or package sorting facilities, among other sources of delay. As deliveries are performed by a UAV or during other aspects of UAV operation, it is desirable to mitigate or lessen possibly undesirable sound output of a UAV's rotor units.

Embodiments described herein relate to rotor units having asymmetric rotor blades, where the asymmetric parameters of the rotor blades are such that the rotor unit's sound output has a desired frequency content, and methodologies for selecting such asymmetric parameters. In an example embodiment, an asymmetric parameter may be selected to increase a number of frequencies in the set of frequencies of the rotor unit's sound output compared to the sound output produced by rotor unit having symmetric rotor blades. Accordingly, in an exemplary embodiment, asymmetric rotor blades may spread energy over more frequencies than symmetric rotor blades. Humans may perceive rotor units that produce a larger number of weaker (e.g., softer) audible frequencies more favorably than rotor units that produce a smaller number of stronger (e.g., louder) audible frequencies, even if the sound pressure level (e.g., dB level) is the same.

In an example embodiment, a UAV may include a rotor unit that includes two or more rotor blades. Each rotor blade may include a surface area and an asymmetric parameter may be defined, at least in part, by the relationship between the surface areas of the two or more rotor blades. The value of the asymmetric parameter may be selected such that the operation of the at least one rotor unit: (i) moves the two or more rotor blades such that each rotor blade produces a respective vortex and (ii) the respective vortices produced by the two or more rotor blades cause the rotor unit to produce a sound output having an energy distribution defined, at least in part, by a set of frequencies. The set of frequencies may include a fundamental frequency, one or more harmonic frequencies of the fundamental frequency, and one or more non-harmonic frequencies of the fundamental frequency having a respective strength greater than a threshold strength.

II. ILLUSTRATIVE UNMANNED VEHICLES

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

FIG. 1A is a simplified illustration providing various views of a UAV, according to an example embodiment. In particular, FIG. 1A shows an example of a fixed-wing UAV 1100a, which may also be referred to as an airplane, an aeroplane, a biplane, a glider, or a plane, among other possibilities. The fixed-wing UAV 1100a, as the name implies, has stationary wings 1102 that generate lift based on the wing shape and the vehicle's forward airspeed. For instance, the two wings 1102 may have an airfoil-shaped cross section to produce an aerodynamic force on the UAV 1100a.

As depicted, the fixed-wing UAV 1100a may include a wing body or fuselage 1104. The wing body 1104 may contain, for example, control electronics such as an inertial measurement unit (IMU) and/or an electronic speed controller, batteries, other sensors, and/or a payload, among other possibilities. The illustrative UAV 1100a may also include landing gear (not shown) to assist with controlled take-offs and landings. In other embodiments, other types of UAVs without landing gear are also possible.

The UAV 1100a further includes propulsion units 1106 positioned on the wings 1106 (or fuselage), which can each include a motor, shaft, and propeller, for propelling the UAV 1100a. Stabilizers 1108 (or fins) may also be attached to the UAV 1110a to stabilize the UAV's yaw (turn left or right) during flight. In some embodiments, the UAV 1100a may be also be configured to function as a glider. To do so, UAV 1100a may power off its motor, propulsion units, etc., and glide for a period of time. In the UAV 1100a, a pair of rotor supports 1110 extend beneath the wings 1106, and a plurality of rotors 1112 are attached rotor supports 1110. Rotors 1112 may be used during a hover mode wherein the UAV 1110a is descending to a delivery location, or ascending following a delivery. In the example UAV 1100a, stabilizers 1108 are shown attached to the rotor supports 1110.

During flight, the UAV 1100a may control the direction and/or speed of its movement by controlling its pitch, roll, yaw, and/or altitude. For example, the stabilizers 1108 may include one or more rudders 1108a for controlling the UAV's yaw, and the wings 1102 may include one or more elevators for controlling the UAV's pitch and/or one or more ailerons 1102a for controlling the UAV's roll. As another example, increasing or decreasing the speed of all the propellers simultaneously can result in the UAV 1100a increasing or decreasing its altitude, respectively.

The UAV 1100a may further include a control system 1120. The control system 1120 is configured to control operation(s) of the UAV 1100a and its components. In some embodiments, the control system 1120 may be configured to perform one or more functions described herein. For example, in some embodiments, the control system 1120 may be configured to operate the propulsion units 1106 and/or the rotors 1112. The control system 1120 may be implemented with mechanical systems and/or with hardware, firmware, and/or software. As one example, the control system 1120 may take the form of program instructions stored on a non-transitory computer readable medium and a processor that executes the instructions. The control system 1120 may be implemented in whole or in part on the UAV 1100a and/or at least one entity remotely located from the UAV 1100a, such as a ground-station (not shown). Generally, the manner in which the control system 1120 is implemented may vary, depending upon the particular application.

Figure 1B:
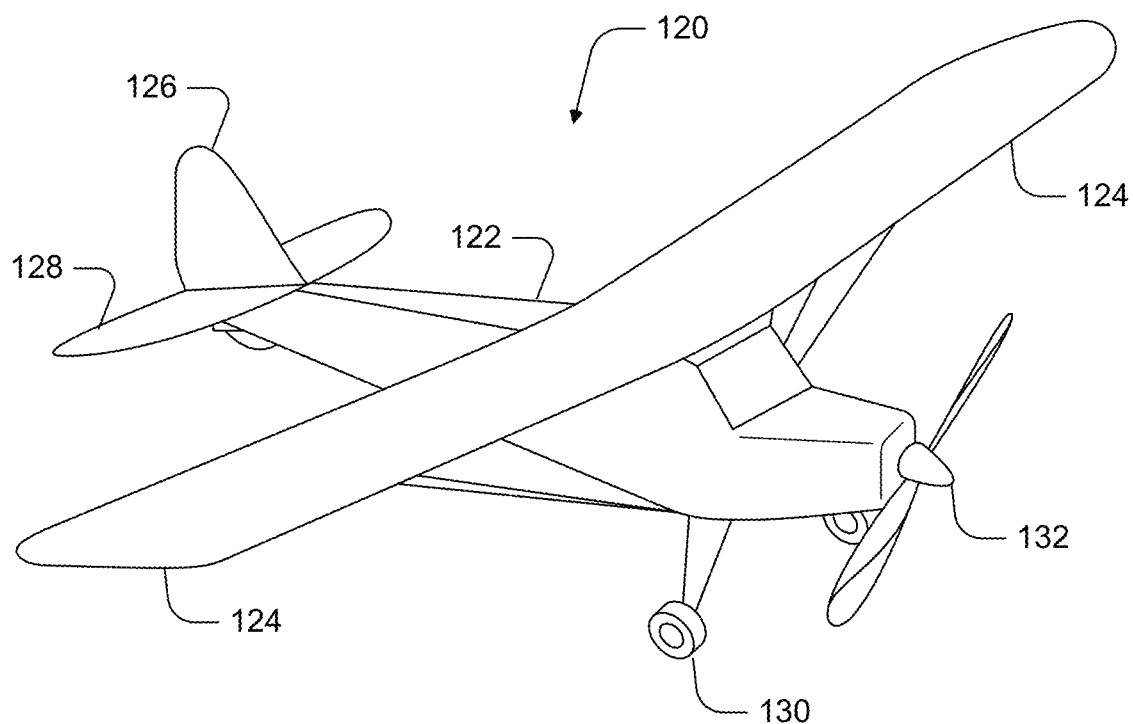
FIG. 1B is a simplified illustration of an unmanned aerial vehicle, according to an example embodiment.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
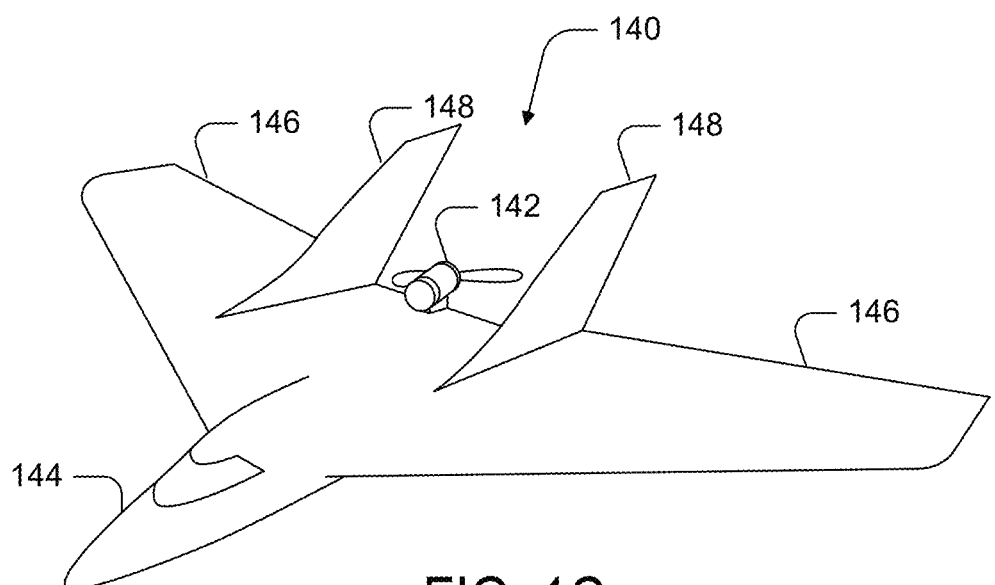
FIG. 1C is a simplified illustration of an unmanned aerial vehicle, according to an example embodiment.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
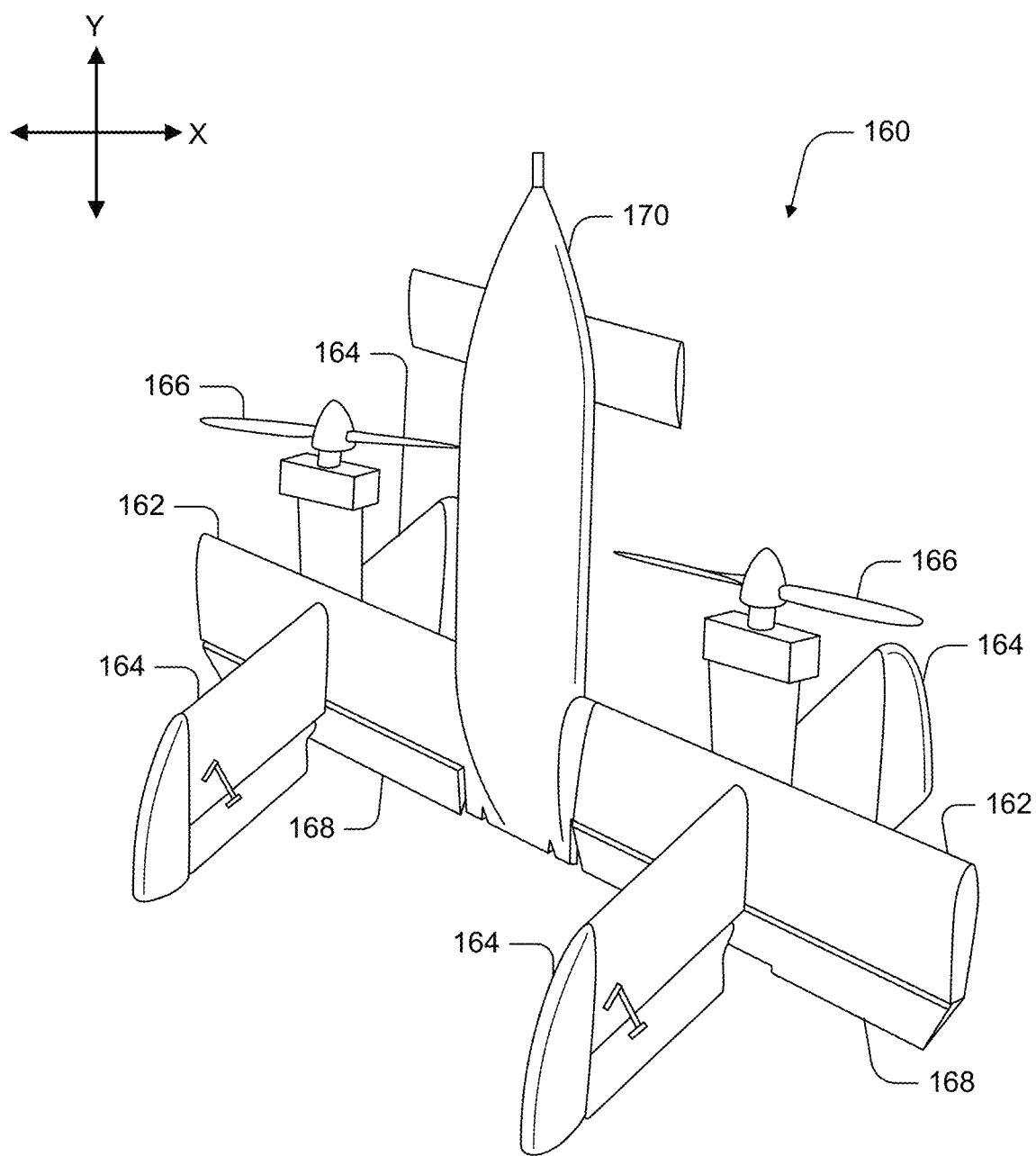
FIG. 1D is a simplified illustration of an unmanned aerial vehicle, according to an example embodiment.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
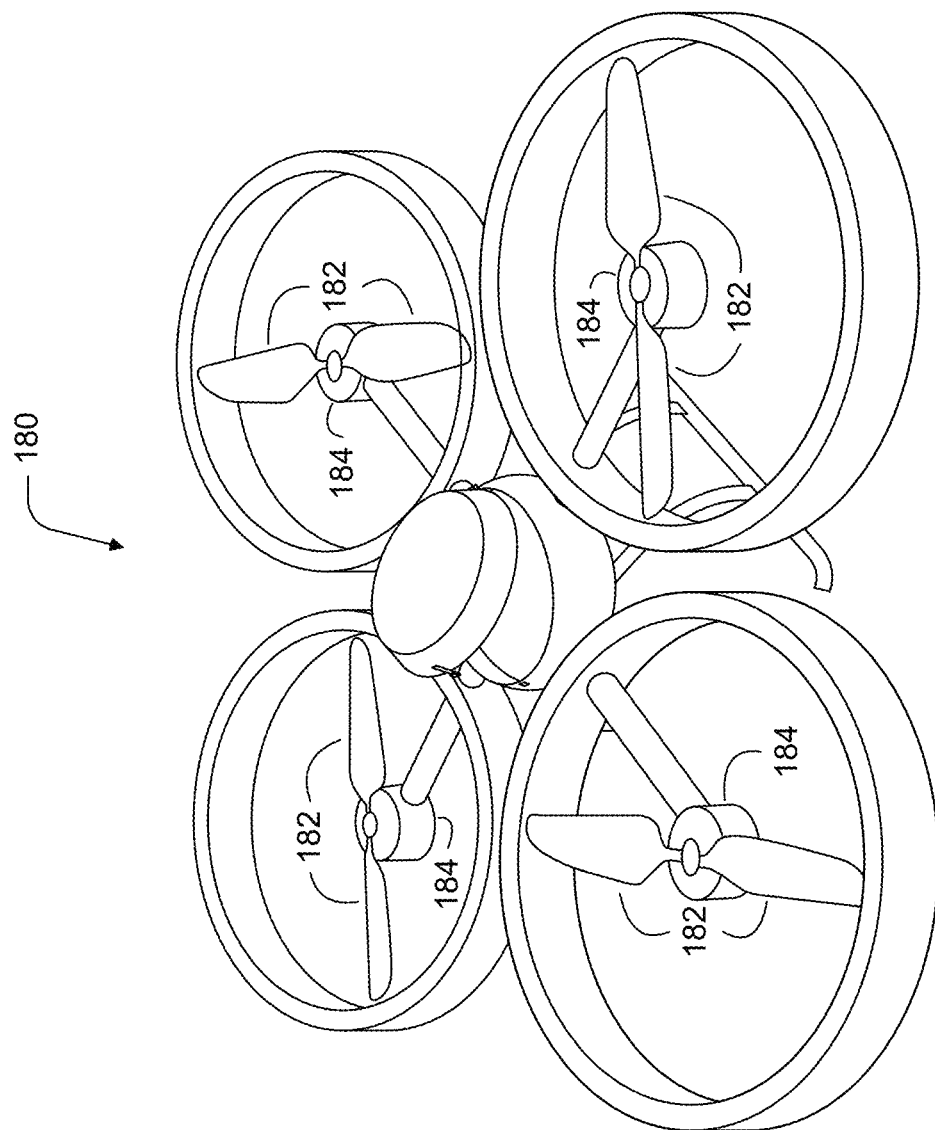
FIG. 1E is a simplified illustration of an unmanned aerial vehicle, according to an example embodiment.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. ILLUSTRATIVE UAV COMPONENTS

Figure 2:
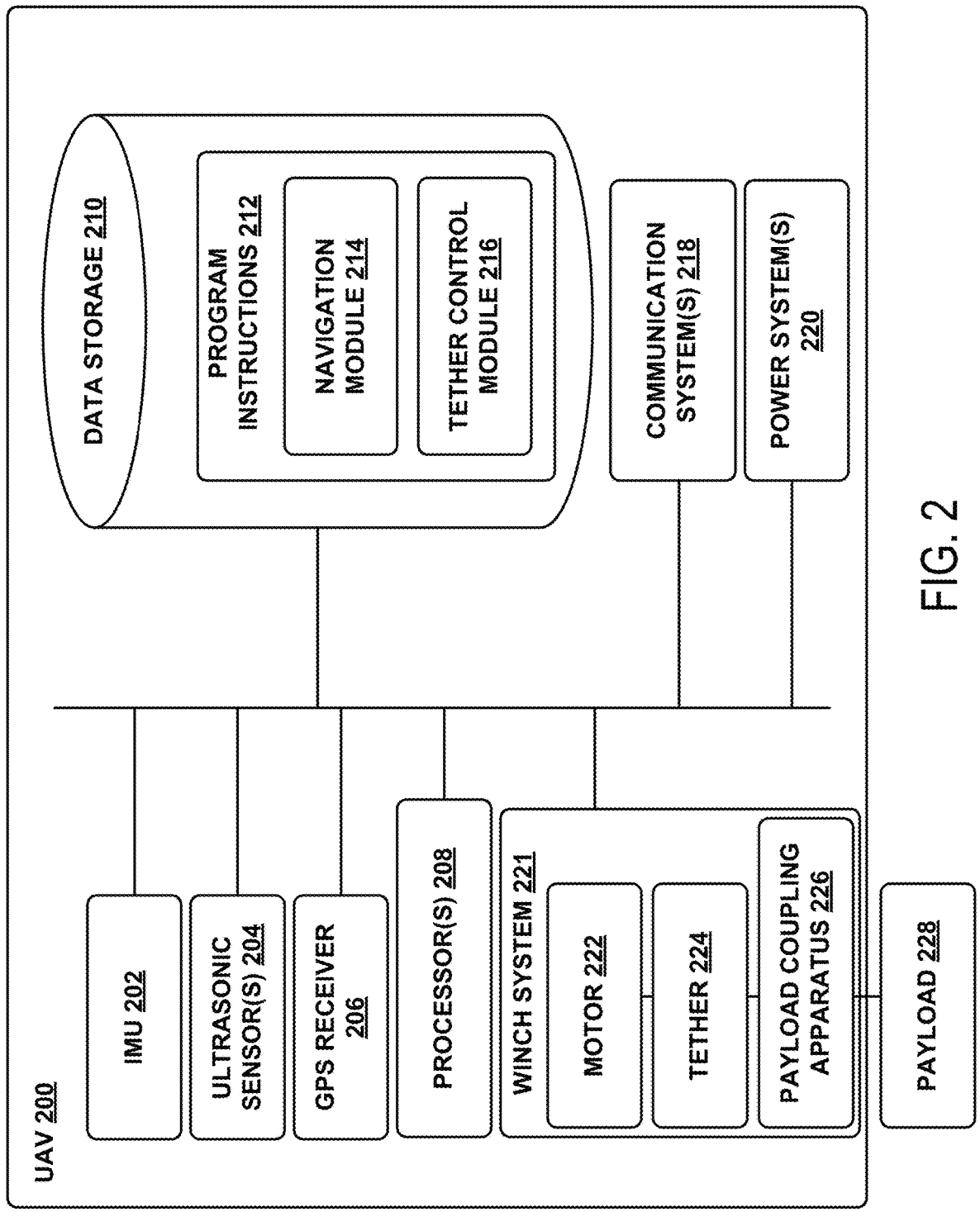
FIG. 2 is a simplified block diagram illustrating components of an unmanned aerial vehicle, according to an example embodiment.

FIG. 2 is a simplified block diagram illustrating components of a UAV 200, according to an example embodiment. UAV 200 may take the form of, or be similar in form to, one of the UAVs 1100a, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

In some embodiments, the control system 1120 may take the form of program instructions 212 and the one or more processors 208.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s)

have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload coupling apparatus 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload coupling apparatus 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operate specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may, based on the current supplied to the motor 222, determine if the payload 228 is attached to the tether 224, if someone or something is pulling on the tether 224, and/or if the payload coupling apparatus 226 is pressing against the UAV 200 after retracting the tether 224. Other examples are possible as well.

During delivery of the payload 228, the payload coupling apparatus 226 can be configured to secure the payload 228 while being lowered from the UAV by the tether 224, and can be further configured to release the payload 228 upon reaching ground level. The payload coupling apparatus 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. ILLUSTRATIVE UAV DEPLOYMENT SYSTEMS

Figure 3:
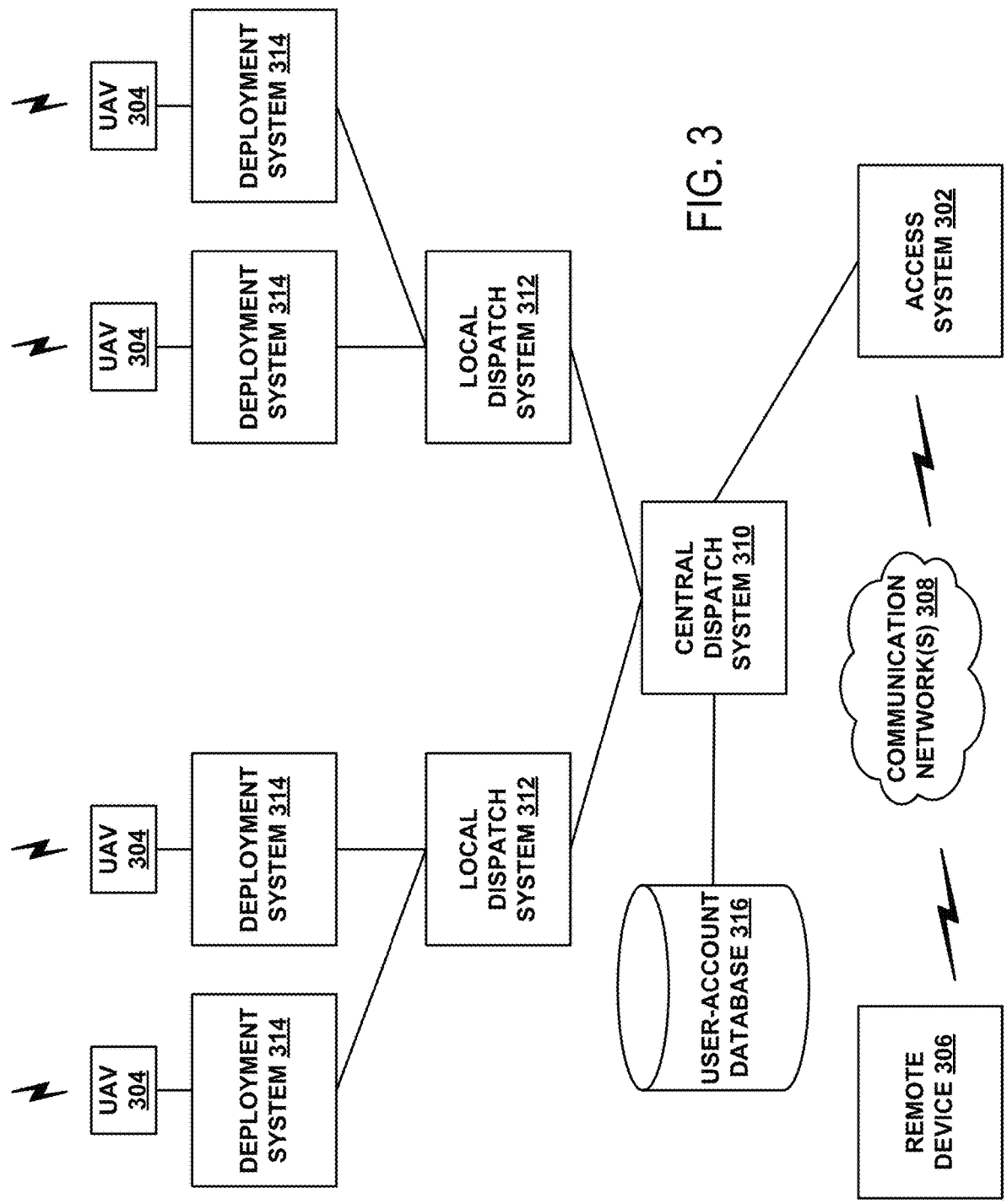
FIG. 3 is a simplified block diagram illustrating a UAV system, according to an example embodiment.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. ILLUSTRATIVE ROTOR UNITS

A. Rotor Units Having Symmetric Rotor Blades

Figure 4A:
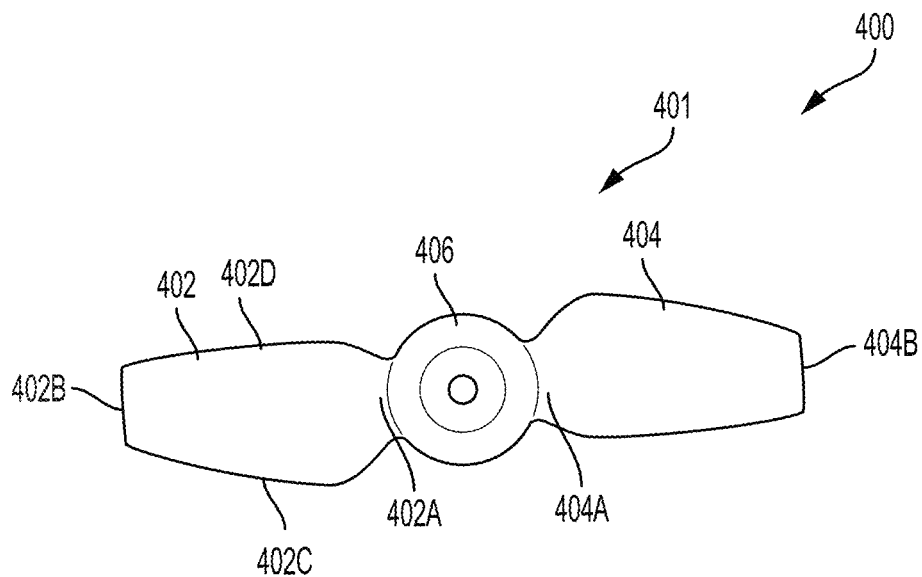
FIG. 4A is a top view of a rotor unit, according to an example embodiment.
Figure 4B:
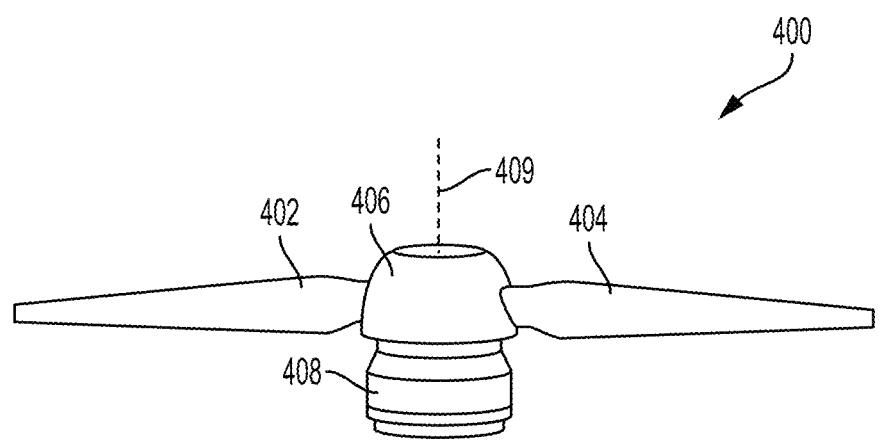
FIG. 4B is a perspective view of the rotor unit depicted in FIG. 4A, according to an example embodiment.

FIGS. 4A and 4B depict a rotor unit 400, according to an example embodiment. The rotor unit 400 may include two or more rotor blades 401. In the illustrated example, the two or more rotor blades 401 include a first rotor blade 402 and a second rotor blade 404. However, in other examples, the two or more rotor blades 401 may include more than two rotor blades, such as three rotor blades, four rotor blades, five rotor blades, six rotor blades, seven rotor blades, etc. The first rotor blade 402 may be coupled to a hub 406, and the second rotor blade 404 may be coupled to the hub 406. The hub 406 may be coupled to a motor 408. The motor 408 may include a fixed portion (not shown) and a shaft (not shown). The shaft may be configured to couple the hub 406 to the fixed portion.

A control system (e.g., the control system 1120) may be configured to operate the rotor unit 400 to provide thrust or lift. In some embodiments, the control system may be configured to operate the rotor unit 400 by operating the motor 408. In operation, the motor 408 may rotate the hub 406, the first rotor blade 402, and the second rotor blade 404 around an axis of rotation 409. With this arrangement, the first rotor blade 402 and the second rotor blade 404 may provide thrust or lift along the axis of rotation 409.

The first rotor blade 402, the second rotor blade 404, the hub 406, and/or the motor 408 may each include a variety of materials, such as one or more metals (e.g., steel), foam, plastic, carbon fiber, composites, e-glass, etc. The motor 408 may be any suitable device for rotating the hub 406, the first rotor blade 402, and the second rotor blade 404 around the axis of rotation 409.

The first rotor blade 402 may include a root 402A and a tip 402B. In some embodiments, the root 402A and the tip 402B may each have different lengths to the hub 406. For example, as shown in FIG. 4A, the root 402A may have a shorter length (e.g., located closer) to the hub 406 than the tip 402B. Further, in some embodiments, the root 402A and the tip 402B may each have different thicknesses. For example, the root 402A may have a greater thickness than the tip 402B.

The first rotor blade 402 may include a twist along a length of the first rotor blade 402, such that an angle from a plane of the first rotor blade 402 that is perpendicular to the axis of rotation 409 varies across the length of the first rotor blade 402. With this arrangement, the first rotor blade 402 may provide substantially the same thrust or lift along the axis of rotation 409 across the length of the first rotor blade 402. For example, the first rotor blade 402 may provide the same thrust or lift along the axis of rotation 402 or a deviation from same that does not cause the rotor unit 400 to operate in a significantly different manner from when the thrust is the same. Further, the first rotor blade 402 may further include a chord. The chord may be a distance between an edge 402C (e.g., leading edge) and an edge 402D (e.g., trailing edge) of the first rotor blade 402 on a line perpendicular to an axis of the first rotor blade 402. In some embodiments, the chord length may refer to a width of the rotor blade.

The first rotor blade 402 may include a twist distribution and chord distribution. The twist distribution may be the variation in twist of portions of the first rotor blade 402 with respect to the distance from the axis of rotation 409. The twist distribution may be based on the root 402A and the tip 402B angles. Further, the chord distribution may be the variation of chord length of portions of the first rotor blade 402 with respect to the distance from the axis of rotation 409. The twist distribution and chord distribution may be a variety of curves, including, for example, linear curves and cubic curves.

The second rotor blade 404 may take the same form the first rotor blade 402 and the second rotor blade 404 may include a root 404A and a tip 404B. In some embodiments, the second rotor blade 404 may have the same dimensions as the first rotor blade 402. With this arrangement, the first rotor blade 402 and the second rotor blade 404 may be symmetric rotor blades.

The second rotor blade 404 may be located substantially opposite the first rotor blade 402. For example, the second rotor blade 404 may be located opposite the first rotor blade 402 or a deviation from opposite that does not cause the rotor unit 400 to operate in a significantly different manner from when the second rotor blade 404 is located opposite the first rotor blade 402.

Further, in some embodiments, the first rotor blade 402 and the second rotor blade 404 may each provide substantially the same thrust or lift along the axis of rotation 409. For example, the first rotor blade 402 and the second rotor blade 404 may each provide the same thrust or lift along the axis of rotation 409 or a deviation from the same that does not cause the rotor unit 400 to operate in a significantly different manner from when the first rotor blade 402 and the second rotor blade 404 provide the same thrust or lift.

FIGS. 5A-5D are simplified illustrations of the operation of the rotor unit 400, according to an example embodiment. In particular, FIGS. 5A-5D depict the operation of the rotor unit 400 at different times, according to example embodiments. The motor 408 may rotate the first rotor blade 402 and the second rotor blade 404 through incoming air 510.

Figure 5A:
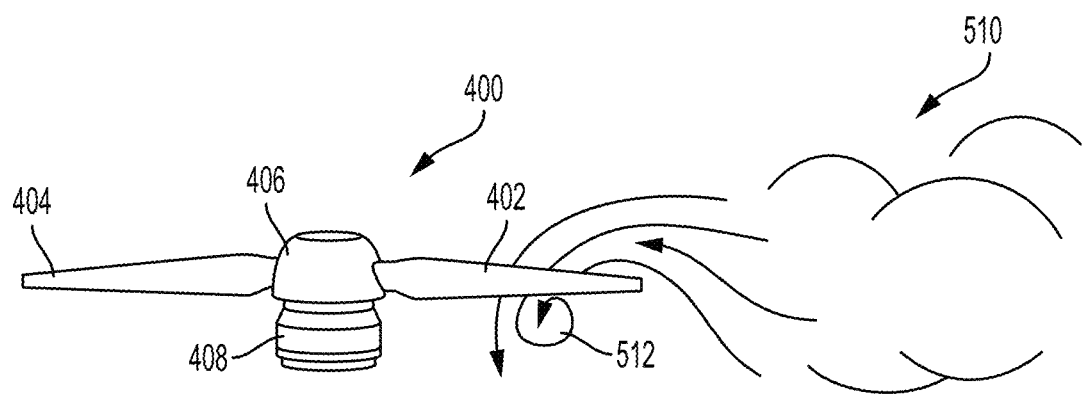
FIGS. 5A-5D are simplified illustrations of the operation of a rotor unit, according to an example embodiment.
Figure 5B:
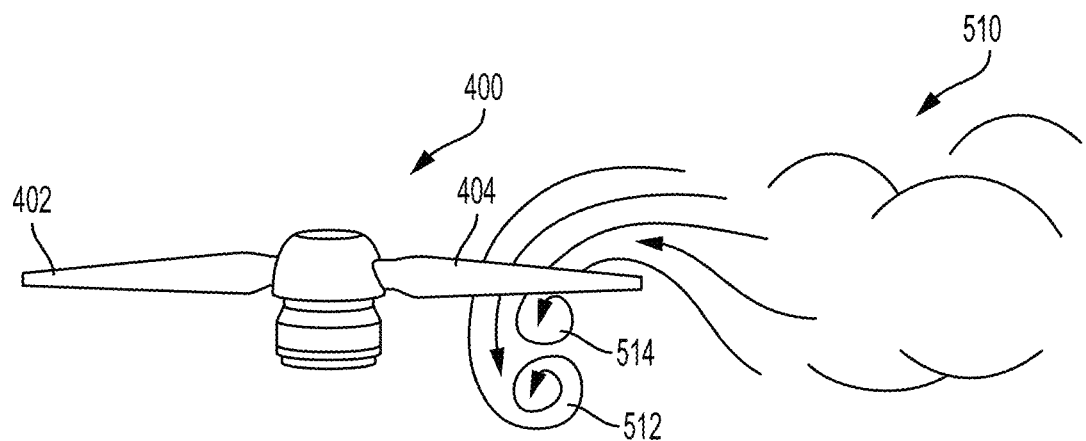

FIG. 5A depicts the operation of the rotor unit 400 at a first time, according to an example embodiment. At the first time, the first rotor blade 402 may (i) move through incoming air 510 and (ii) produce (e.g., shed) a first vortex 512. FIG. 5B depicts the operation of the rotor unit 400 at a second time, according to an example embodiment. At the second time, the second rotor blade 404 may (i) move through incoming air 510 and (ii) produce a second vortex 514. Further, at the second time, the first vortex 512 may propagate away from the rotor unit 400. In some embodiments, the rotor unit 400 may have a blade passing frequency. Further, in some embodiments, the blade passing frequency may be the inverse of the difference of the first and second times.

Figure 5C:
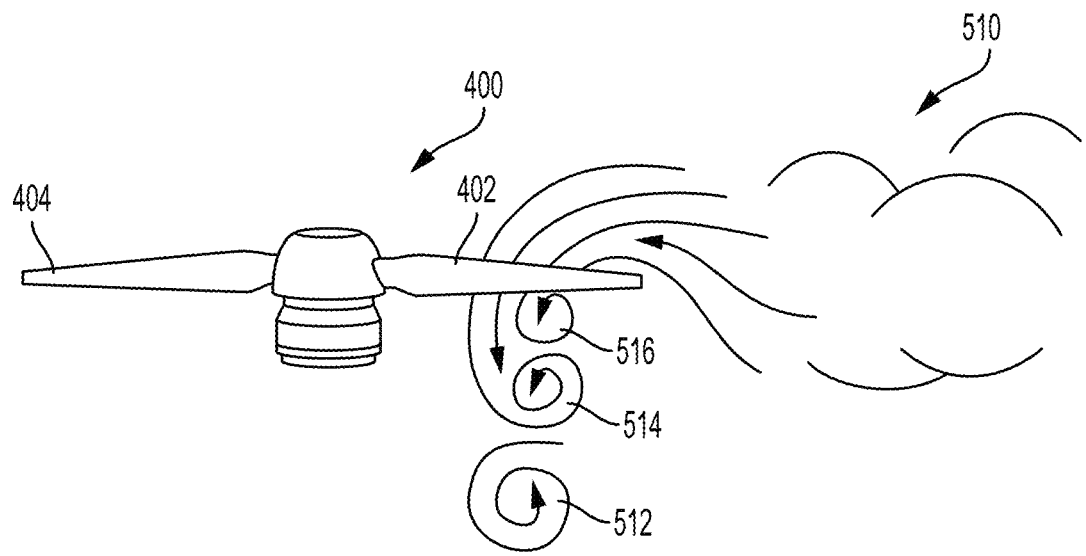
Figure 5D:
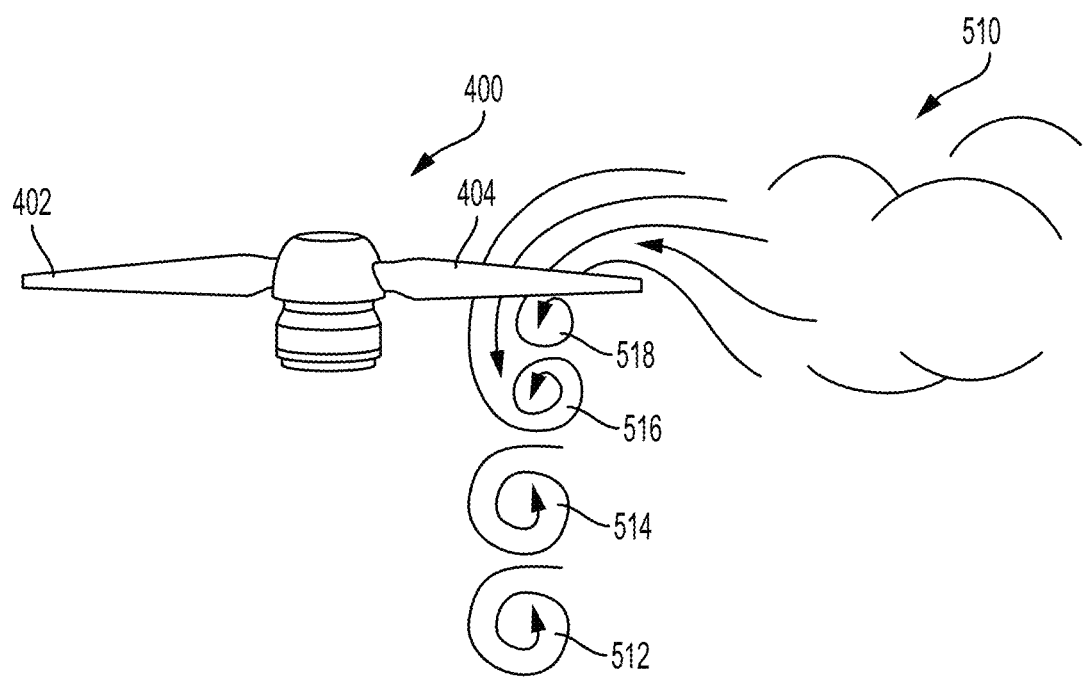

FIG. 5C depicts the operation of the rotor unit 400 at a third time, according to an example embodiment. At the third time, the first rotor blade 402 may (i) move through incoming air 510 and (ii) produce a third vortex 516. Further, at the third time, the second vortex 514 may propagate away from the rotor unit 400 and the first vortex 512 may further propagate away from the rotor unit 610. FIG. 5D depicts the operation of the rotor unit 400 at a fourth time, according to an example embodiment. At the fourth time, the second rotor blade 404 may (i) move through incoming air 510 and (ii) produce a fourth vortex 518. Further, at the fourth time, the third vortex 516 may propagate away from the rotor unit 400, the second vortex 514 may further propagate away from the rotor unit 400, and the first vortex 512 may still further propagate away from the rotor unit 610.

In some embodiments, the first vortex 512 and the third vortex 516 may be produced by the tip 402B of the first rotor blade 402 and the second vortex 514 and the fourth vortex 518 may be produced by the tip 404B of the second rotor blade 404. Further, in some embodiments, the first vortex 512, the second vortex 514, the third vortex 516, and the fourth vortex 518 may each be a trailing tip vortex. Moreover, in some embodiments, the first vortex 512, the second vortex 514, the third vortex 516, and the fourth vortex 518 may each have the same strength. In some embodiments, the strength of a vortex may be the vorticity of the vortex. Further, in some embodiments, the first vortex 512, the second vortex 514, the third vortex 516, and the fourth vortex 518 may each propagate at the same period.

Figure 6:
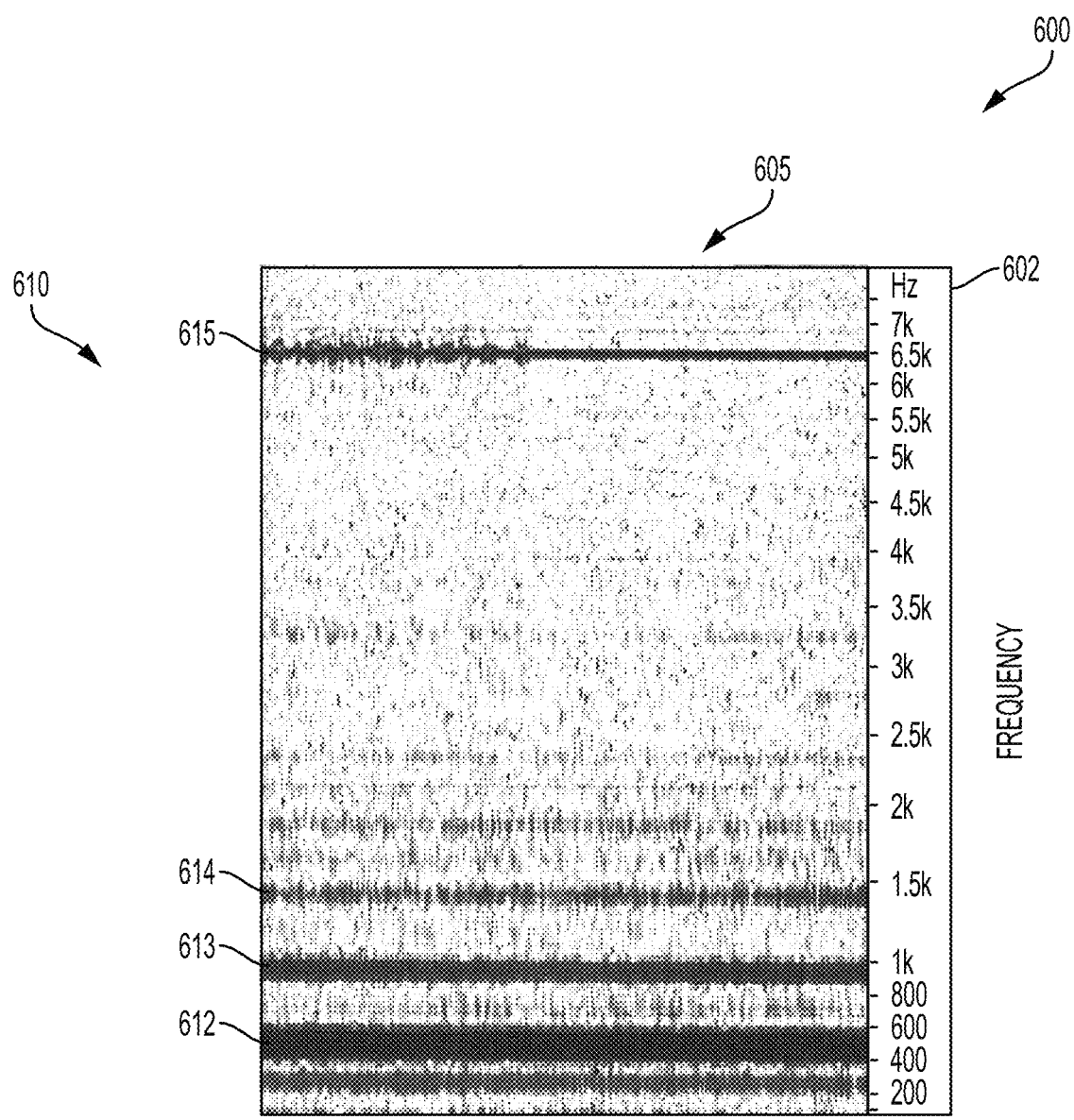
FIG. 6 is a spectrogram of an example sound output produced by a rotor unit, according to an example embodiment.
Figure 7A:
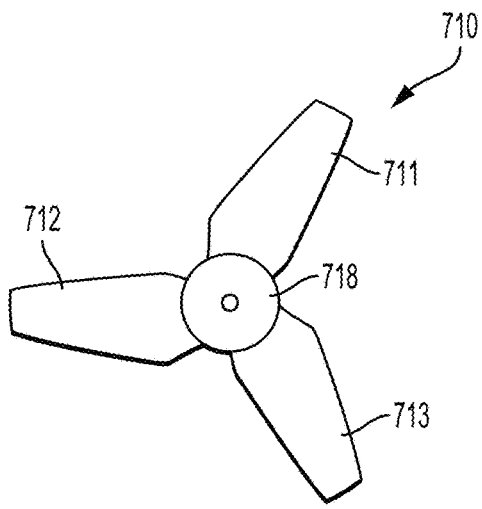
FIGS. 7A-7E are top views of rotor units, according to an example embodiment.
Figure 7B:
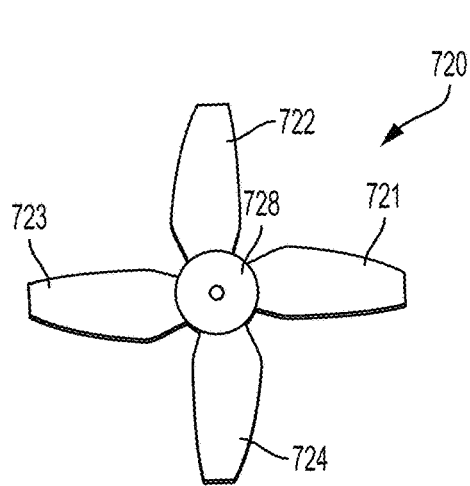
Figure 7C:
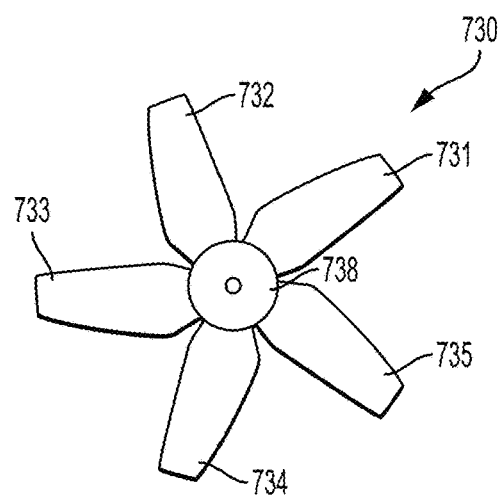
Figure 7D:
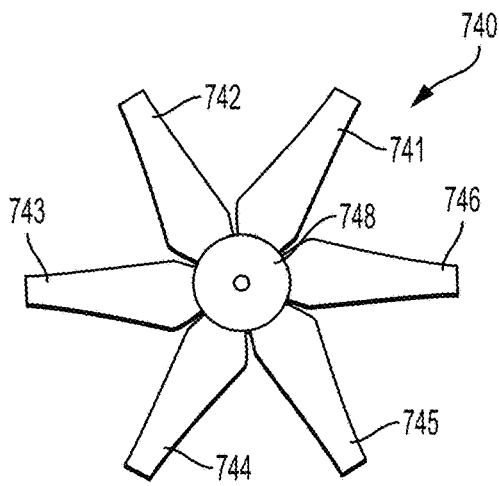
Figure 7E:
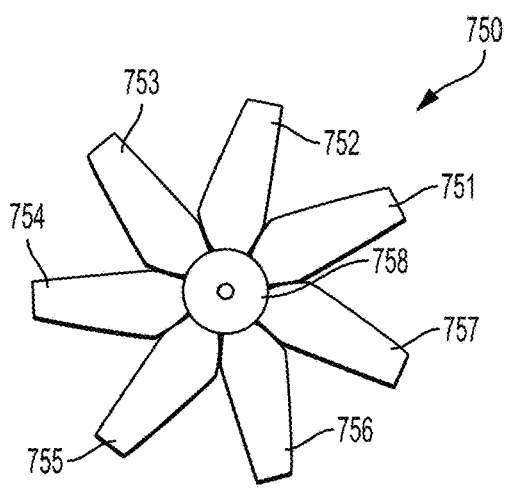

The operation of the rotor unit 400 may cause the rotor unit 400 to produce a sound output. FIG. 6 is a spectrogram 600 of an example sound output produced by the rotor unit 400, according to an example embodiment. The example sound output has an energy distribution 605 defined, at least in part, by a set of frequencies 610. As shown in FIG. 6, the set of frequencies 610 is plotted on a frequency axis 602.

The set of frequencies 610 may include a fundamental frequency and one or more harmonic frequencies of the fundamental frequency. In some embodiments, the fundamental frequency may be a fundamental frequency of the rotor unit. Further, in some embodiments, the fundamental frequency may be a blade passing frequency of the rotor unit. In some embodiments, the blade passing frequency may be 500 hertz (Hz). Moreover, in some embodiments, the one or more harmonic frequencies may be an integer multiple of the fundamental frequency. As shown in FIG. 6, the set of frequencies 610 may include frequencies 612, 613, 614, and 615. In some embodiments, the frequency 612 may be a fundamental frequency. Further, in some embodiments, the frequencies 613, 614, and 615 may each be a harmonic frequency of the frequency 612.

The frequencies in the set of frequencies 610 may have different strengths. In the illustrated example, the frequency 612 may have the highest strength in the set of frequencies 610. Further, in some embodiments, each of the frequencies

612, 613, 614, and 615 in the set of frequencies 610 may have a strength that is greater than a threshold strength. In some embodiments, a frequency having a strength less than the threshold strength might not be audible to humans. The threshold strength may be, for example, 5 dB(A).

Although the rotor unit 400 in the illustrated example described above includes two rotor blades, in other examples, rotor units may include more than two rotor blades. FIGS. 7A-7E depict rotor units 710, 720, 730, 740, and 750, respectively. Rotor units 710, 720, 730, 740, and 750 include more than two rotor blades. As shown in FIG. 7A-7E, the rotor unit 710 may include three rotor blades 711, 712, and 713 each coupled to a hub 718; the rotor unit 720 may include four rotor blades 721, 722, 723, and 724 each coupled to a hub 728; the rotor unit 730 may include five rotor blades 731, 732, 733, 734, and 735 each coupled to a hub 738; the rotor unit 740 may include six rotor blades 741, 742, 743, 744, 745, and 746 each coupled to a hub 748; and the rotor unit 750 may include seven rotor blades 751, 752, 753, 754, 755, 756, and 757 each coupled to a hub 758. The hubs of the rotor units 710, 720, 730, 740, and 750 may take the same or similar form as the hub 406. Further, the rotor blades of the rotor units 710, 720, 730, 740, and 750 may each take the form of the first rotor blade 402. In some embodiments, the rotor blades of the rotor units 710, 720, 730, 740, and 750 may have the same dimensions. With this arrangement, the rotor blades of the rotor units 710, 720, 730, 740, and 750 may be symmetric rotor blades.

The operation of any one of the rotor units 710, 720, 730, 740, and 750 may cause the one rotor unit to produce a sound output having an energy distribution defined, at least in part, by a set of frequencies. The set of frequencies may include a fundamental frequency and one or more harmonic frequencies of the fundamental frequency.

B. Rotor Units Having Asymmetric Rotor Blades

Figure 8A:
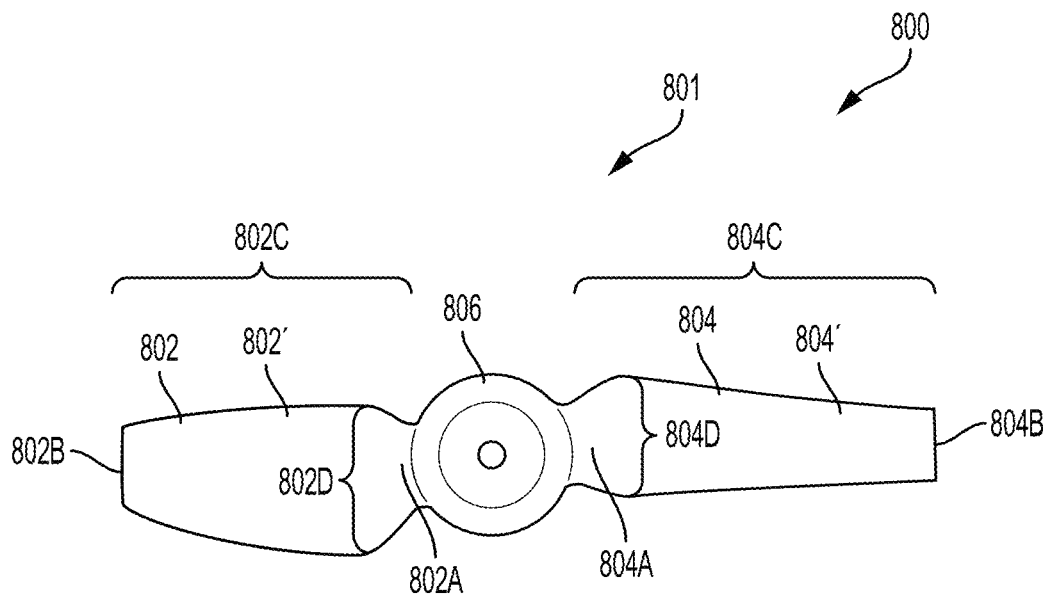
FIG. 8A is a top view of a rotor unit, according to an example embodiment.
Figure 8B:
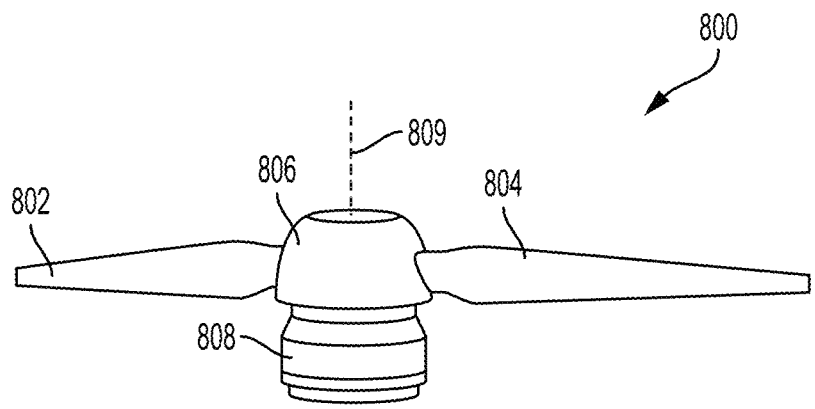
FIG. 8B is a perspective view of the rotor unit depicted in FIG. 8A, according to an example embodiment.

FIGS. 8A and 8B depict a rotor unit 800, according to an example embodiment. The rotor unit 800 may be similar to the rotor unit 400, except that a first rotor blade 802 and a second rotor blade 804 are asymmetric rotor blades. The rotors 1112, the propulsion units 1106, the propulsion unit 132, the propulsion unit 142, propellers 166, and/or rotors 182 may take the form of the rotor unit 800.

The rotor unit 800 may include two or more rotor blades 801. In the illustrated example, the two or more rotor blades 801 include the first rotor blade 802 and the second rotor blade 804. However, in other examples, the two or more rotor blades 801 may include more than two rotor blades, such as three rotor blades, four rotor blades, five rotor blades, six rotor blades, seven rotor blades, etc. For example, the two or more rotor blades 801 may have an arrangement of rotor blades similar to the arrangement of rotor blades in the rotor units 710, 720, 730, 740, or 750.

The first rotor blade 802 may be coupled to a hub 806, the second rotor blade 804 may be coupled to the hub 806, and the hub 806 may be coupled to a motor 808. The hub 806 and the motor 808 may be of the same configuration and operate in similar manner as the hub 406 and the motor 408, respectively.

A control system (e.g., the control system 1120) may be configured to operate the rotor unit 800 to provide thrust or lift. The control system may be configured to operate the rotor unit 800 in the same or similar way as a control system is configured to operate the rotor unit 400. In operation, the motor 808 may rotate the hub 808, the first rotor blade 802, and the second rotor blade 804 around an axis of rotation 809. With this arrangement, the first rotor blade 802 and the second rotor blade 804 may provide thrust or lift along the axis of rotation 809.

The first rotor blade 802 and the second rotor blade 804 may be of a similar configuration as the first rotor blade 402. The first rotor blade 802 and the second rotor blade 804 may include the same materials as the first rotor blade 402. Further, the first rotor blade 802 may include a root 802A and a tip 802B; and the second rotor blade 804 may include a root 804A and a tip 804B. Moreover, the first rotor blade 802 may have a twist distribution and a chord distribution and the second rotor blade 804 may have a twist distribution and a chord distribution.

The second rotor blade 804 may be located substantially opposite the first rotor blade 802. For example, the second rotor blade 804 may be located opposite the first rotor blade 802 or a deviation from opposite that does not cause the rotor unit 800 to operate in a significantly different manner from when the second rotor blade 804 is located opposite the first rotor blade 802.

Further, in some embodiments, the first rotor blade 802 and the second rotor blade 804 may each provide substantially the same thrust or lift along the axis of rotation 809. For example, the first rotor blade 802 and the second rotor blade 804 may each provide the same thrust or lift along the axis of rotation 809 or a deviation from the same that does not cause the rotor unit 800 to operate in a significantly different manner from when the first rotor blade 802 and the second rotor blade 804 provide the same thrust or lift.

The first rotor blade 802 and the second rotor blade 804 may each include a surface area 802' and 804', and an asymmetric parameter may be defined, at least in part, by the relationship between the surface area 802' and the surface area 804'. In some embodiments, the surface area 802' and the surface area 804' may each be constant or permanent. With this arrangement, the surface area 802' might not change during operation of the rotor unit 800 and the surface area 804' might not change during operation of the rotor unit 800. Accordingly, in some embodiments, the asymmetric parameter may be constant or permanent. Further, in some embodiments, the asymmetric parameter might not change during operation of the rotor unit 800. Moreover, in some embodiments, the surface area 802' may be a blade area of the first rotor blade 802 and the surface area 804' may be a blade area of the second rotor blade 804.

In the illustrated example, the first rotor blade 802 may have a length 802C, the second rotor blade 804 may have a length 804C that is greater than the length 802C, and the asymmetric parameter may be defined, at least in part, by a difference between the length 804C and the length 802C. In some embodiments, the lengths 802C and 804C may be a span of the first rotor blade 802 and second rotor blade 804, respectively. The span may be a length of a straight line between a root and a tip of a rotor blade. In some embodiments, the length 802C may be, for instance, approximately 2.5 inches and the length 804C may be, for instance, may be approximately 3 inches.

Further, the first rotor blade 802 may have a width 802D, the second rotor blade may have a width 804D that is less than width 802D, and an asymmetric parameter may be defined, based at least in part, by a difference between the width 802D and the width 804D. In some embodiments, the first rotor blade 802 and the second rotor blade 804 may have different widths across the entire rotor blade. Moreover, in some embodiments, the first rotor blade 802 and the second rotor blade 804 may have different widths at one or more portions of the rotor blade, including, for example, at different spanwise locations along the rotor blade.

Further still, an asymmetric parameter may be defined, at least in part, by the relationship of two or more dimensions of the rotor blades. In some embodiments, an asymmetric parameter may be defined, based in part, by the relationship between the length 802C and the length 804C and the width 802D and the width 804D.

FIGS. 9A-9D are simplified illustrations of the operation of the rotor unit 800, according to an example embodiment. In particular, FIGS. 9A-9D depict the operation of the rotor unit 800 at different times, according to example embodiments. The motor 808 may rotate the first rotor blade 802 and a second rotor blade 802 through incoming air 910. The incoming air 910 may have the same configuration and function in a similar manner as the incoming air 510.

Figure 9A:
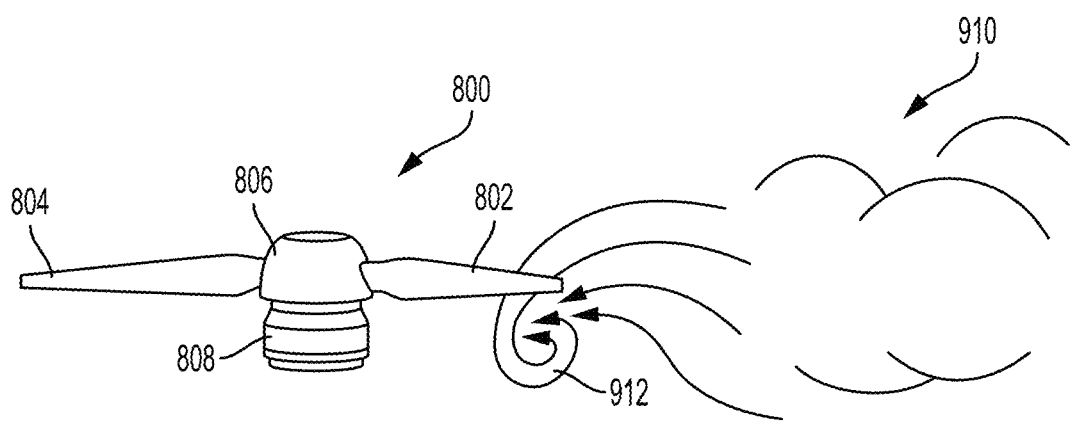
FIGS. 9A-9D are simplified illustrations of the operation of a rotor unit, according to an example embodiment.
Figure 9B:
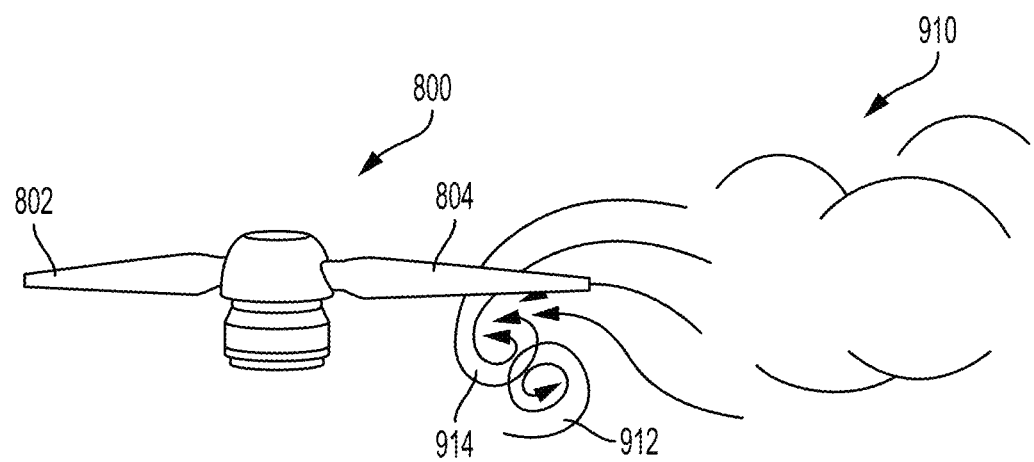

FIG. 9A depicts the operation of the rotor unit 800 at a first time, according to an example embodiment. At the first time, the first rotor blade 802 may (i) move through incoming air 910 and (ii) produce a first vortex 912. FIG. 9B depicts the operation of the rotor unit 800 at a second time, according to an example embodiment. At the second time, the second rotor blade 804 may (i) move through incoming air 910 and (ii) produce a second vortex 914.

The first vortex 912 and the second vortex 914 may be different. In some embodiments, the first vortex 912 may have a first size and the second vortex 914 may have second size that is different size than the first size. Further, in some embodiments, the first vortex 912 may have a first strength and the second vortex 914 may have a second strength that is different than the first strength. Moreover, in some embodiments, the first vortex 912 may be offset from the second vortex 914. With this arrangement, the first vortex 912 and the second vortex 914 may overlap.

Figure 9C:
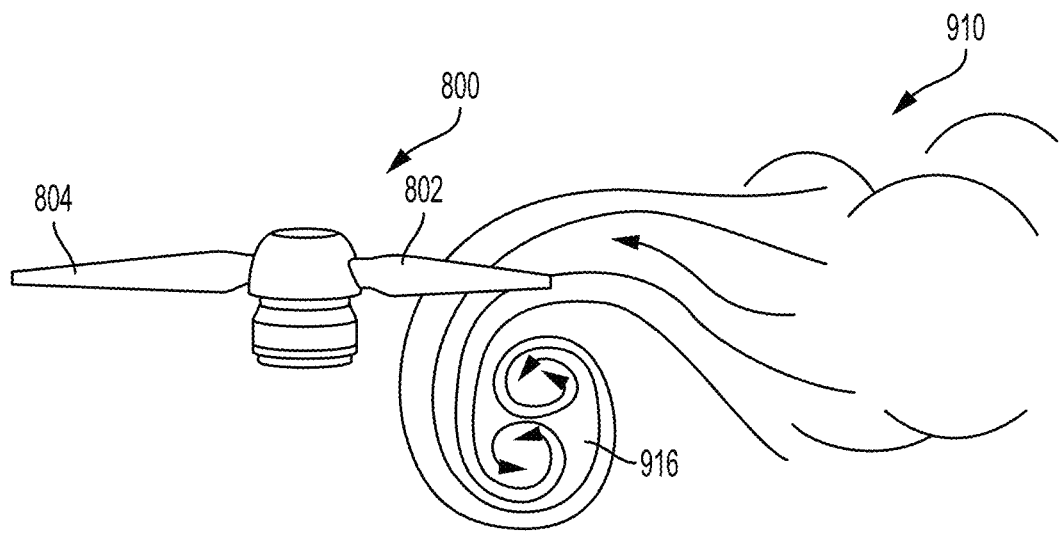
Figure 9D:
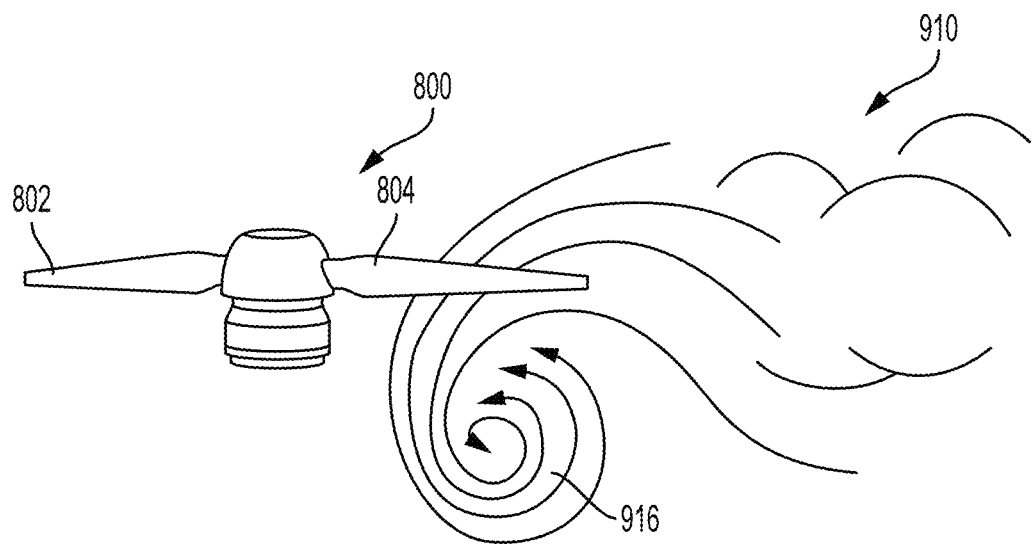

FIG. 9C depicts the operation of the rotor unit 800 at a third time, according to an example embodiment. At the third time, the first rotor blade 802 may (i) move through incoming air 910 and (ii) the first vortex 912 and the second vortex 914 may couple to form a third vortex 916. FIG. 9D depicts the operation of the rotor unit 800 at a fourth time, according to an example embodiment. At the fourth time, the second rotor blade 804 may (i) move through incoming air 910 and (ii) the third vortex 916 may propagate away from the rotor unit 800.

In some embodiments, the first vortex 912 may be produced by the tip 802B of the first rotor blade 802 and the second vortex 914 may be produced by the tip 804B of the second rotor blade 804. Further, in some embodiments, the first vortex 912 and the second vortex 914 may each be a trailing tip vortex.

Moreover, in some embodiments, the first vortex 912 propagates at a first period and the second vortex 914 propagates at a second period that is substantially the same as the first period. For example, the second period may be the same as the first period or a deviation from the first period that does not cause the rotor unit 800 to produce a significantly different sound output. Further, in some embodiments, the third vortex 916 may propagate at a third period that is different than the first and second periods.

The operation of the rotor unit 800 may cause the rotor unit 800 to produce a sound output. Further, in some embodiments, the first vortex 912 produced by the first rotor blade 802 and the second vortex 914 produced by the second rotor blade 804 may cause the rotor unit 800 to produce the sound output. The sound output may have an energy distribution defined, at least in part, by a set of frequencies. The set of frequencies may include a fundamental frequency, one or more harmonic frequencies of the fundamental frequency, and one or more non-harmonic frequencies of the fundamental frequency having a respective strength that is greater than a threshold strength.

The asymmetric parameter of a rotor unit may be selected such that the rotor unit produces a desired sound output. In some embodiments, the asymmetric parameter may be selected to increase a number of frequencies in the set of frequencies of the rotor unit's sound output compared to the sound output produced by a rotor unit having symmetric rotor blades. Accordingly, in some embodiments, asymmetric rotor blades may spread energy over more frequencies than symmetric rotor blades.

Figure 10:
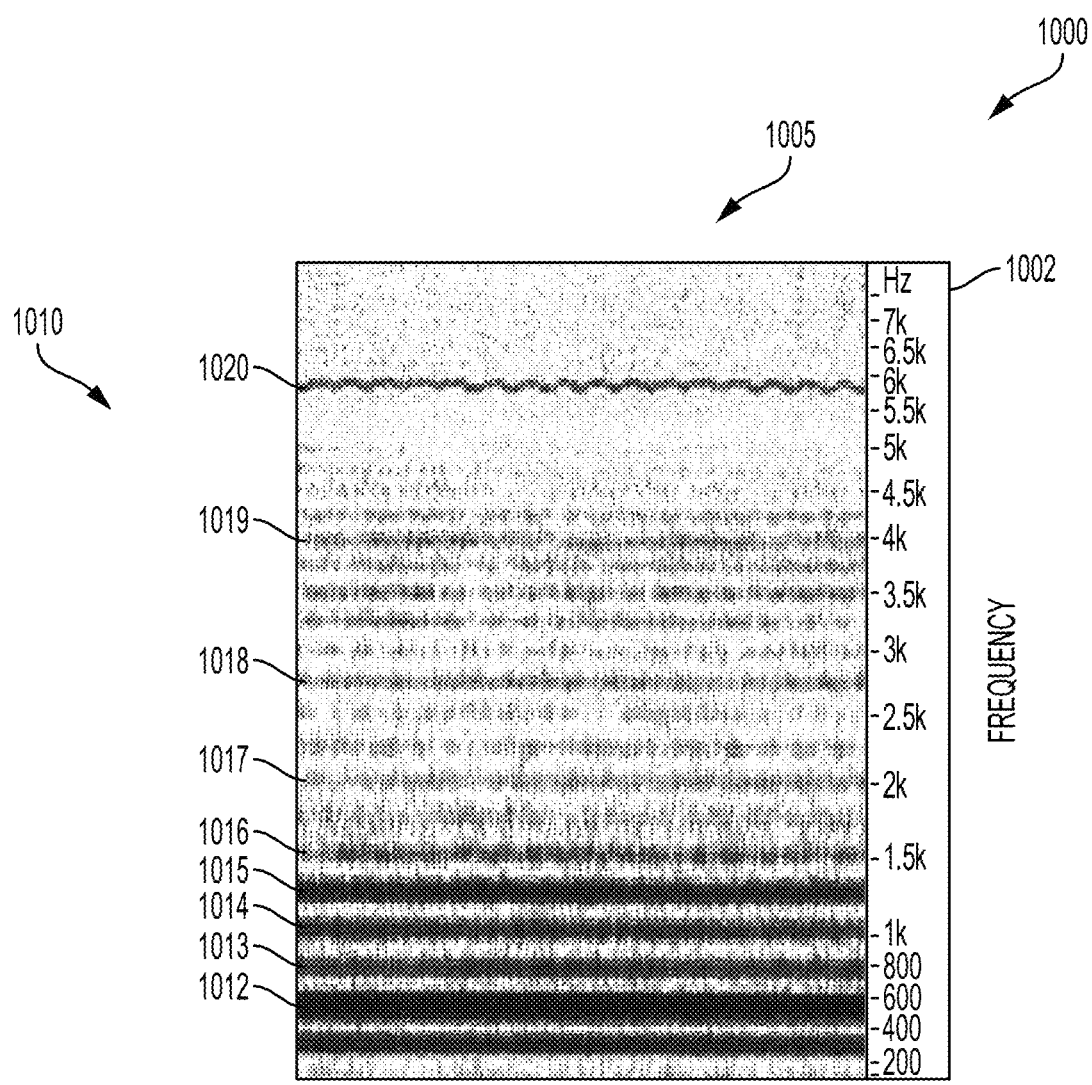
FIG. 10 is a spectrogram of an example sound output produced by a rotor unit, according to an example embodiment.

FIG. 10 is a spectrogram 1000 of an example sound output produced by the rotor unit 800, according to an example embodiment. The example sound output has an energy distribution 1005 defined, at least in part, by a set of frequencies 1010. As shown in FIG. 10, the set of frequencies 1010 is plotted on a frequency axis 1002.

The set of frequencies 1010 may include a fundamental frequency, one or more harmonic frequencies of the fundamental frequency, and one or more non-harmonic frequencies of the fundamental frequency having a respective strength that is greater than a threshold strength. As shown in FIG. 10, the set of frequencies may include frequencies 1012, 1013, 1014, 1015, 1016, 1017, 1018, 1019, and 1020. In some embodiments, the frequency 1012 may be a fundamental frequency, such as a blade passing frequency of the rotor unit. Further, in some embodiments, the frequencies 1014, 1016, 1017, 1019, and 1020 may each be a harmonic frequency of the frequency 1012. Moreover, in some embodiments, the frequencies 1013, 1015, and 1018 may each by a non-harmonic frequency of the frequency 1012.

The frequencies in the set of frequencies 1010 may have different strengths. In the illustrated example, the frequency 1012 may have the highest strength in the set of frequencies 1010. Further, in some embodiments, the each of the frequencies 1012, 1013, 1014, 1015, 1016, 1017, 1018, 1019, and 1020 in the set of frequencies 1010 may have a strength that is greater than a threshold strength.

As shown in FIGS. 6 and 10, the set of frequencies 1010 and the set of frequencies 610 may be different. For example, when the energy distribution 1005 and the energy distribution 605 have the same total energy, the set of frequencies 1010 may have a larger number of frequencies than the set of frequencies 610. Further, when the energy distribution 1005 and the energy distribution 605 have the same total energy, at least one frequency of the frequencies 1012, 1013, 1014, 1015, 1016, 1017, 1018, 1019, and 1020 may be weaker than at least one frequency of the frequencies 612, 613, 614, and 615. As one example, the frequency 1012 may be weaker than the frequency 612. As another example, the frequency 1020 may be weaker than the frequency 615.

The set of frequencies 1010 may include a larger number of weaker frequencies than the set of frequencies 610 based on the set of frequencies 1010 including one or more non-harmonic frequencies of the fundamental frequency having a respective strength that is greater than a threshold strength. In contrast, the set of frequencies 610 might not include any non-harmonic frequencies of the fundamental frequency having a respective strength that is greater than the threshold strength.

Further, the asymmetric parameter of a rotor unit may be selected such that the rotor unit produces a predetermined output. In some embodiments, the asymmetric parameter may be selected such that the rotor unit produces a sound output having an energy distribution defined, at least in part, by a set of frequencies that includes a predetermined number of frequencies. Further, in some embodiments, the asymmetric parameter may be selected such that the rotor unit produces a sound output having an energy distribution defined, at least in part, by a set of frequencies that includes at least one frequency having a predetermined strength.

Figure 11A:
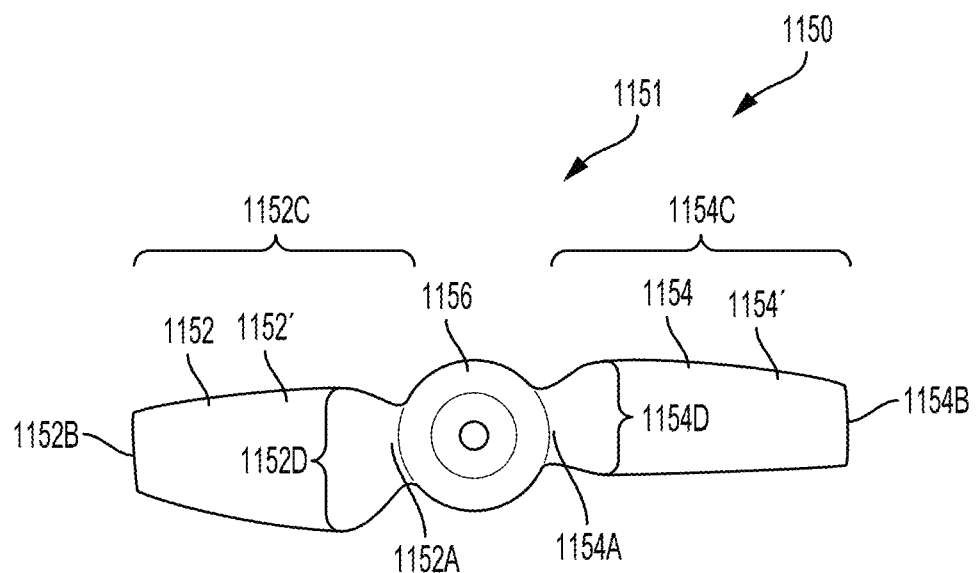
FIG. 11A is a top view of a rotor unit, according to an example embodiment.
Figure 11B:
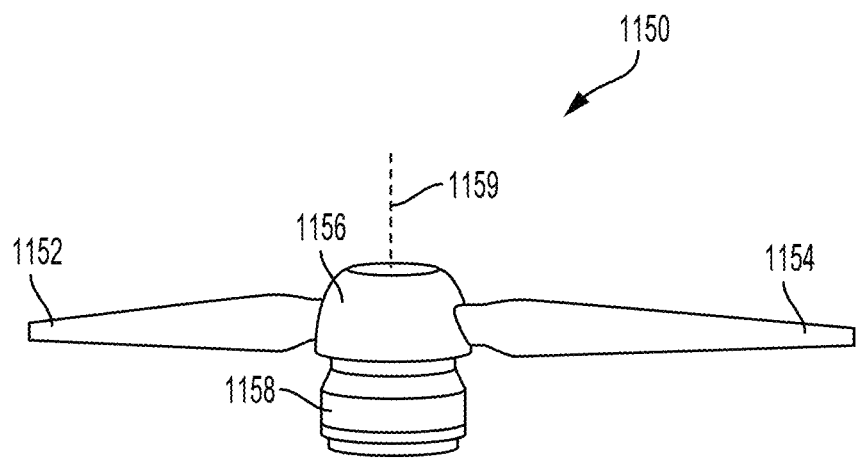
FIG. 11B is a perspective view of the rotor unit depicted in FIG. 11A, according to an example embodiment.

FIGS. 11A and 11B depict a rotor unit 1150, according to an example embodiment. The rotor unit 1150 may be similar to the rotor unit 800, except that the rotor unit 1150 may have an asymmetric parameter that is different than the asymmetric parameter of the rotor unit 800. The rotors 1112, the propulsion units 1106, the propulsion unit 132, the propulsion unit 142, propellers 166, and/or rotors 182 may take the form of the rotor unit 1150.

The rotor unit 1150 may include two or more rotor blades 1151. In the illustrated example, the two or more rotor blades 1151 include a first rotor blade 1152 and a second rotor blade 1154. However, similar to the two or more rotor blades 801, the two or more rotor blades 1151 may include more than two rotor blades, such as three rotor blades, four rotor blades, five rotor blades, six rotor blades, seven rotor blades, etc.

The first rotor blade 1152 may be coupled to a hub 1156, the second rotor blade 1154 may be coupled to the hub 1156, and the hub 1156 may be coupled to a motor 1158. The hub 1156 and the motor 1158 may be of the same configuration and operate in similar manner as the hub 806 and the motor 808, respectively.

A control system (e.g., the control system 1120) may be configured to operate the rotor unit 1150 to provide thrust or lift. The control system may be configured to operate the rotor unit 1150 in the same or similar way as the control system is configured to operate the rotor unit 800. In operation, the motor 1158 may rotate the hub 1158, the first rotor blade 1152, and the second rotor blade 1154 around an axis of rotation 1159. With this arrangement, the first rotor blade 1152 and the second rotor blade 1154 may provide thrust or lift along the axis of rotation 1159.

The first rotor blade 1152 and the second rotor blade 1154 may be of a similar configuration as the first rotor blade 802. The first rotor blade 1152 and the second rotor blade 1154 may include the same materials as the first rotor blade 802. Further, the first rotor blade 1152 may include a root 1152A and a tip 1152B; and the second rotor blade 1154 may include a root 1154A and a tip 1154B. Moreover, the first rotor blade 1152 may have a twist distribution and a chord distribution and the second rotor blade 1154 may have a twist distribution and a chord distribution.

The second rotor blade 1154 may be located substantially opposite the first rotor blade 1152. For example, the second rotor blade 804 may be located opposite the first rotor blade 1152 or a deviation from opposite that does not cause the rotor unit 1150 to operate in a significantly different manner from when the second rotor blade 1154 is located opposite the first rotor blade 1152.

Further, in some embodiments, the first rotor blade 1152 and the second rotor blade 1154 may each provide substantially the same thrust or lift along the axis of rotation 1159. For example, the first rotor blade 1152 and the second rotor blade 804 may each provide the same thrust or lift along the axis of rotation 1159 or a deviation from the same that does not cause the rotor unit 1150 to operate in a significantly different manner from when the first rotor blade 1152 and the second rotor blade 1154 provide the same thrust or lift.

The first rotor blade 1152 and the second rotor blade 1154 may each include a surface area 1152' and 1154', and an asymmetric parameter may be defined, at least in part, by the relationship between the surface area 1152' and the surface area 1154'. In some embodiments, the surface area 1152' and the surface area 1154' may each be constant or permanent. With this arrangement, the surface area 1152' might not change during operation of the rotor unit 1150 and the surface area 1154' might not change during operation of the rotor unit 800. Accordingly, in some embodiments, the asymmetric parameter may be constant or permanent. Further, in some embodiments, the asymmetric parameter might not change during operation of the rotor unit 1150. Moreover, in some embodiments, the surface areas 1152' may be a blade area of the first rotor blade 1152 and the surface area 1154' may be a blade area of the second rotor blade 1154.

In the illustrated example, the first rotor blade 1152 may have a length 1152C, the second rotor blade 1154 may have a length 1154C that is greater than the length 1152C, and the asymmetric parameter may be defined, at least in part, by the relationship between the length 1154C and the length 1152C. Like the lengths 802C and 804C, the lengths 1152C and 1154C may be a span of the first rotor blade 1152 and the second rotor blade 1154, respectively. In some embodiments, the length 1154C may be less than the length 804C. Further, in some embodiments, the length 1152C may be, for instance, approximately 2.5 inches and the length 1154C may be, for instance, approximately 2.75 inches.

Further, the first rotor blade 1152 may have a width 1152D, the second rotor blade may have a width 1154D that is less than width 1152D, and an asymmetric parameter may be defined, based at least in part, by a difference between the width 1152D and 1154D. In some embodiments, the first rotor blade 1152 and the second rotor blade 1154 may have different widths across the entire rotor blade. Moreover, in some embodiments, the first rotor blade 1152 and the second rotor blade 1154 may have different widths at one or more portions of the rotor blade including, for example, at different spanwise locations of the rotor blade.

The operation of the rotor unit 1150 may move the first rotor blade 1152 and the second rotor blade 1154 such that the first rotor blade 1152 produces a first vortex and the second rotor blade 1154 produces a second vortex and the respective vortices produced by the first rotor blade 1152 and the second rotor blade 1154 may cause the rotor unit 1150 to produce a sound output having an energy distribution defined, at least in part, by a set of frequencies. The set of frequencies may include a fundamental frequency, one or more harmonic frequencies of the fundamental frequency, and one or more non-harmonic frequencies of the fundamental frequency having a respective strength greater than a threshold strength. The fundamental frequency may be a blade passing frequency of the rotor unit 1150.

Figure 12:
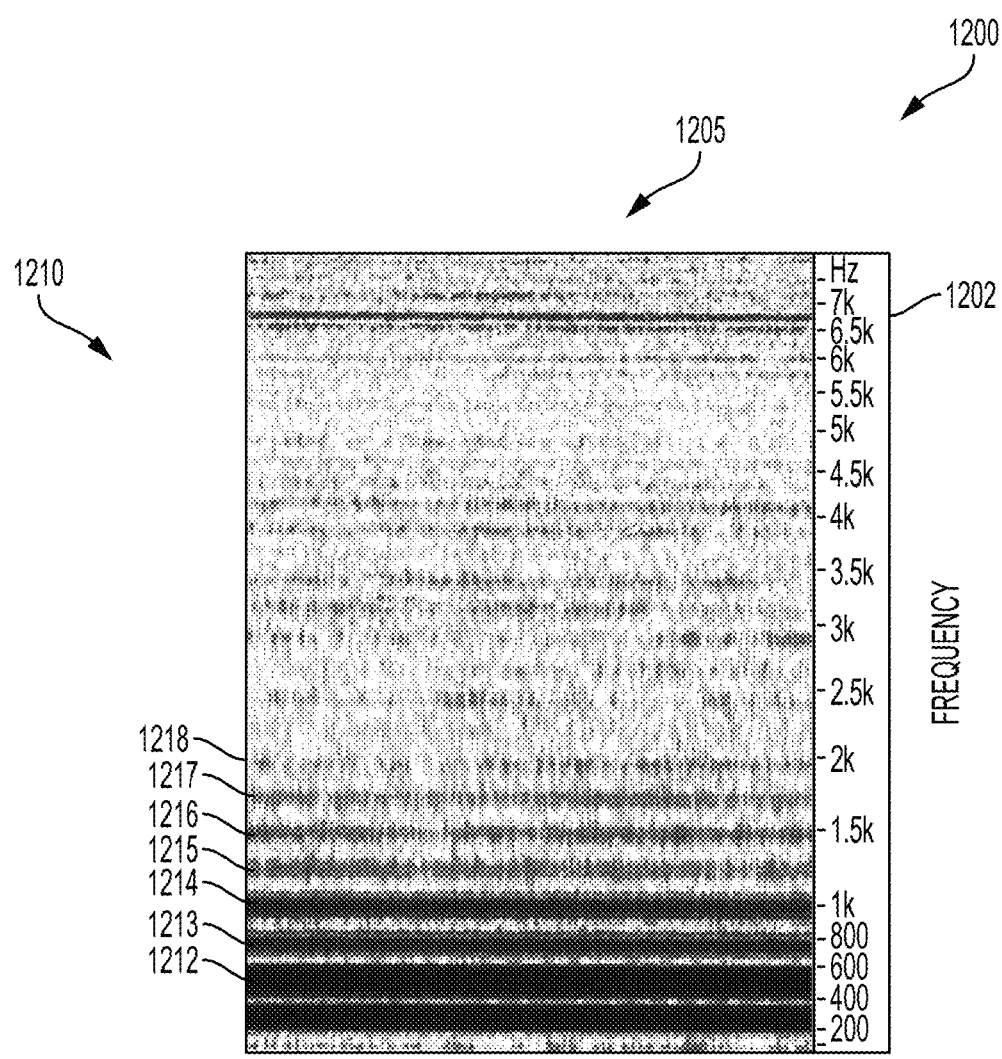
FIG. 12 is a spectrogram of an example sound output produced by a rotor unit, according to an example embodiment.

Rotor units having different asymmetric parameters may produce different sound outputs. FIG. 12 is a spectrogram 1200 of an example sound output produced by the rotor unit 1200, according to an example embodiment. The example sound output has an energy distribution 1205 defined, at least in part, by a set of frequencies 1210. As shown in FIG. 12, the set of frequencies 1210 is plotted on a frequency axis 1202.

The set of frequencies 1210 may include a fundamental frequency, one or more harmonic frequencies of the fundamental frequency, and one or more non-harmonic frequencies. As shown in FIG. 12, the set of frequencies may include frequencies 1212, 1213, 1214, 1215, 1216, 1217, and 1218. In some embodiments, the frequency 1212 may be a fundamental frequency, such as a blade passing frequency of the rotor unit. Further, in some embodiments, the frequencies 1214, 1216, and 1218 may each be a harmonic frequency of the frequency 1212. Moreover, in some embodiments the frequencies 1213, 1215, and 1217 may each by a non-harmonic frequency of the frequency 1212.

The frequencies in the set of frequencies 1210 may have different strengths. In the illustrated example, the frequency 1212 may have the highest strength in the set of frequencies 1210. Further, in some embodiments, the each of the frequencies 1212, 1213, 1214, 1215, 1216, 1217, and 1218 in the set of frequencies 1210 may have a strength that is greater than the threshold strength.

As shown in FIGS. 10 and 12, the set of frequencies 1210 and the set of frequencies 1010 may be different. For example, when the energy distribution 1205 and the energy distribution 1005 have the same total energy, the set of frequencies 1210 may have a smaller number of frequencies than the set of frequencies 1010. Further, when the energy distribution 1205 and the energy distribution 1005 have the same total energy, at least one frequency of the frequencies 1212, 1213, 1214, 1215, 1216, 1217, and 1218 may have a different strength than at least one frequency of the frequencies 1012, 1013, 1014, 1015, 1016, 1017, 1018, 1019, and 1020. As one example, the frequency 1212 may have a different strength than the frequency 1012. As another example, the frequency 1218 may be weaker than the frequency 1020.

Although the rotor units 800 and 1100 and graphical representations 900 and 1200 described above involve asymmetric parameters defined, based at least in part, by the relationship between surface areas of the rotor blades, such as the relationship between lengths and/or widths of the rotor blades, in other examples, asymmetric parameters may be defined, based at least in part, by the relationship between other geometric parameters of the rotor blades. In some examples, a rotor unit may include a first rotor blade and a second rotor blade, the first rotor blade may have a first twist distribution, the second rotor blade may have a second twist distribution that is different than the first twist distribution, and an asymmetric parameter may be defined, based at least in part, by the relationship between the twist distributions of the rotor blades. Further, in some examples, a rotor unit may include a first rotor blade and a second rotor blade, the first rotor blade may have a first chord distribution, the second rotor blade may have a second chord distribution that is different than the first chord distribution, and an asymmetric parameter may be defined, based at least in part, by the relationship between the chord distributions of the rotor blades. Operation of the rotor units having differences in the twist distribution and/or the chord distribution of the rotor blades may cause the rotor unit to produce a sound output having an energy distribution defined, at least in part, by a set of frequencies, wherein the set of frequencies comprises a fundamental frequency, one or more harmonic frequencies of the fundamental frequency, and one or more non-harmonic frequencies of the fundamental frequency having a respective strength greater than a threshold strength.

Although the rotor units 800 and 1100 and graphical representations 900 and 1200 described in the illustrated examples involve two rotor blades, in other examples, asymmetric parameters may be defined, based at least in part, by the relationship between the surface areas of three or more rotor blades. In some embodiments, at least two rotor blades of three or more rotor blades may have a different planar dimension (e.g., length), and the asymmetric parameter may be defined, based in part, by the relationship between the planar dimensions of the three or more rotor blades. Further, in some embodiments, at least a first rotor blade and second rotor blade of three rotor blades may have different first planar dimensions (e.g., length), at least the first rotor blade and a third rotor blade of the three or more rotor blades may have different second planar dimensions (e.g., width), and the asymmetric parameter may be defined, at least in part, by the relationship between the first planar dimensions and the second planar dimensions of the three or more rotor blades.

Further, in some embodiments, the value of the asymmetric parameter may be selected such that the operation of the rotor unit: (i) moves the three or more rotor blades such that each rotor blade produces a respective vortex and (ii) the respective vortices produced by the three or more rotor blades cause the rotor unit to produce a sound output having an energy distribution defined, at least in part, by a set of frequencies, wherein the set of frequencies includes a fundamental frequency, one or more harmonic frequencies of the fundamental frequency, and one or more non-harmonic frequencies of the fundamental frequency having a respective strength greater than a threshold strength.

C. UAV's Having a Plurality Rotor Units

A UAV may include a plurality of rotor units described herein. For example, a UAV may include two, three, four, five, six, seven, eight, nine, ten, eleven, and twelve rotor units and each rotor unit may take the form of the rotor unit 800 or the rotor unit 1150. In some embodiments, the rotor units may each have substantially the same sound outputs, asymmetric parameters, and/or sets of frequencies. However, in other embodiments, at least two rotor units may have different sound outputs, asymmetric parameters, and/or sets of frequencies.

Figure 13:
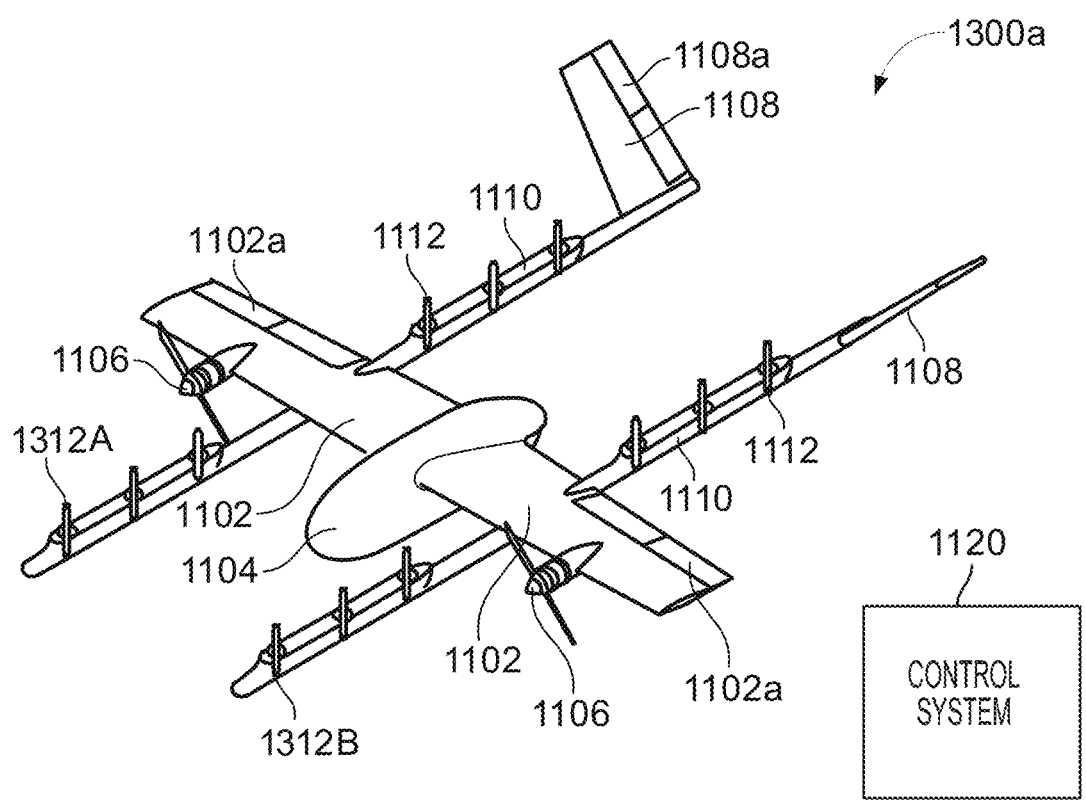
FIG. 13 is a simplified illustration of an unmanned aerial vehicle, according to an example embodiment.

FIG. 13 depicts a fixed-wing UAV 1300*a*, according to an example embodiment. The UAV 1300*a* may have a similar configuration as the UAV 1100*a* and function in a similar manner, except that the UAV 1300*a* may include a first rotor unit 1312A and a second rotor unit 1312B. The first and second rotor units 1312A and 1312B may have the same configuration and function in a similar manner as the rotor unit 800 or the rotor unit 1150.

In some embodiments, the first rotor unit 1312A may include a first rotor blade and a second rotor blade, the first rotor blade may include a first length, the second rotor blade may include a second length, a first asymmetric parameter may be defined, at least in part, by the relationship between the first length and the second length, and the value of the asymmetric parameter may be selected such that operation of the first rotor unit 1312A: (i) moves the first rotor blade such that the first rotor blade produces a first trailing tip vortex, (ii) moves the second rotor blade such that the second rotor blade produces a second trailing tip vortex, and (iii) the first trailing tip vortex produced by the first rotor blade and the second trailing tip vortex produced by the second rotor blade cause the first rotor unit 1312A to produce a first sound output having a first energy distribution defined, at least in part, by a first set of frequencies, where the first set of frequencies may include a first fundamental frequency, one or more first harmonic frequencies of the first fundamental frequency, and one or more first non-harmonic frequencies of the first fundamental frequency having a respective strength greater than a threshold strength.

Further, in some such embodiments, the second rotor unit 1312B may include a third rotor blade and a fourth rotor blade, the third rotor blade may include a third length, the fourth rotor blade may include a fourth length, a second asymmetric parameter may be defined, at least in part, by the relationship between the third length and the fourth length, and the value of the asymmetric parameter may be selected such that operation of the second rotor unit 1312B: (i) moves the third rotor blade such that the third rotor blade produces a third trailing tip vortex, (ii) moves the fourth rotor blade such that the fourth rotor blade produces a fourth trailing tip vortex, and (iii) the third trailing tip vortex produced by the third rotor blade and the fourth trailing tip vortex produced by the fourth rotor blade cause the second rotor unit 1312A to produce a second sound output having a second energy distribution defined, at least in part, by a second set of frequencies, where the second set of frequencies may include a second fundamental frequency, one or more first harmonic frequencies of the second fundamental frequency, and one or more first non-harmonic frequencies of the second fundamental frequency having a respective strength greater than a threshold strength.

In some embodiments, the first asymmetric parameter may be substantially the same as the second asymmetric parameter. For example, the first asymmetric parameter may be the same as the second asymmetric parameter or a deviation from the same that does not cause the first rotor unit 1312A and the second rotor unit 1312B to produce different sound outputs. However, in other embodiments, the first asymmetric parameter may be different than the second asymmetric parameter.

Further, in some embodiments, the first set of frequencies may be substantially the same as the second set of frequencies. For example, the first set of frequencies may be the same as the second set of frequencies or a deviation from the same that does not cause the first rotor unit 1312A and the second rotor unit 1312B to produce different sound outputs. However, in other embodiments, the first set of frequencies may be different than the second set of frequencies. As one example, the first set of frequencies may have a different number of frequencies than the second set of frequencies. As another example, at least one frequency in the first set of frequencies may have a different strength than a corresponding frequency in the second set of frequencies.

VI. ILLUSTRATIVE METHODS

Figure 14:
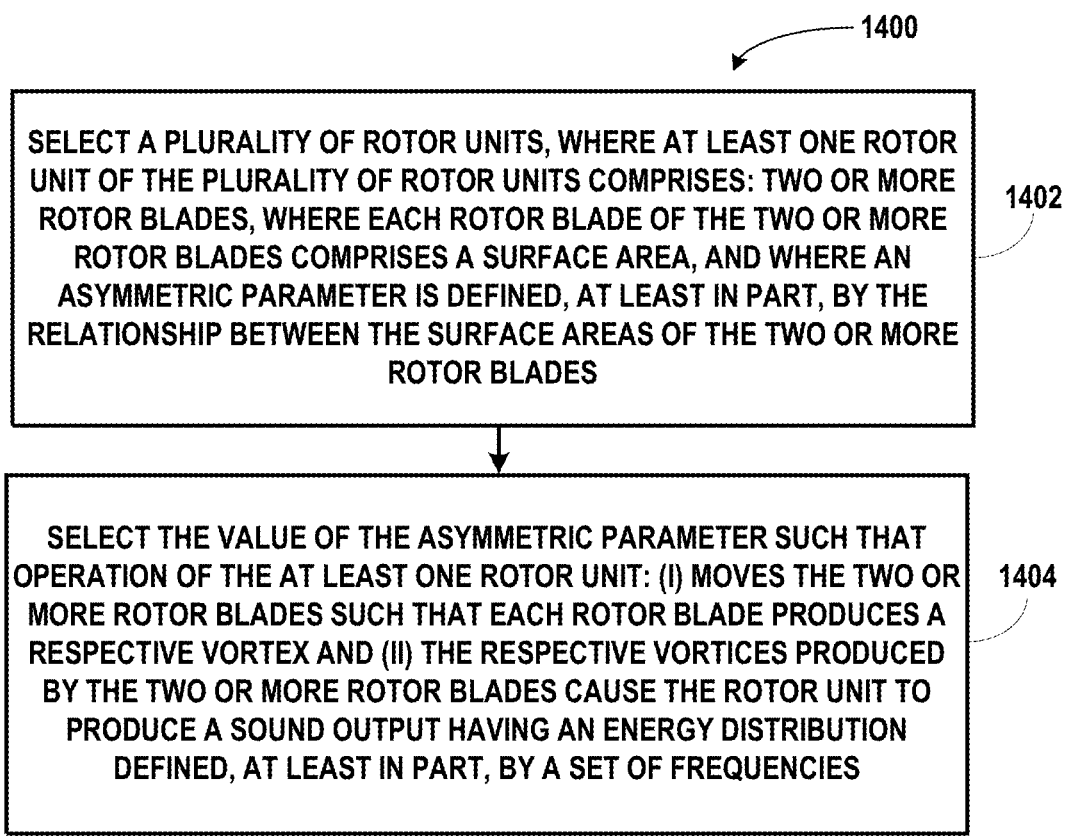
FIG. 14 is a flow chart of a method for selecting the value of asymmetric parameters of rotor blades, according to an example embodiment.

FIG. 14 is a flow chart illustrating a method 1400 for selecting the value of asymmetric parameters of rotor blades, according to an example embodiment.

As shown by block 1402, method 1400 may involve selecting a plurality of rotor units. At least one rotor unit of the plurality of rotor units may include two or more rotor blades, each rotor blade of the two or more rotor blades may include a surface area, and an asymmetric parameter may be defined, at least in part, by the relationship between the surface areas of the two or more rotor blades.

In some embodiments, the at least one rotor unit may take the form of or be similar in form to the rotor unit 800 or the rotor unit 1150. Further, in some embodiments, the plurality of rotor units may be selected, at least in part, to provide a desired thrust or lift for an aerial vehicle.

As shown by block 1404, method 1400 may involve selecting the value of the asymmetric parameter such that operation of the at least one rotor unit: (i) moves the two or more rotor blades such that each rotor blade produces a respective vortex and (ii) the respective vortices produced by the two or more rotor blades cause the rotor unit to produce a sound output having an energy distribution defined, at least in part, by a set of frequencies. The set of frequencies may include a fundamental frequency, one or more harmonic frequencies of the fundamental frequency, and one or more non-harmonic frequencies.

In some embodiments, the energy distribution may take the form of or be similar in form to the energy distribution 505 or the energy distribution 1005 and the set of frequencies may take the form of or be similar in form to the set of frequencies 510 or the set of frequencies 1010.

Further, in some embodiments, the value of the asymmetric parameter is selected such that operation of the rotor unit: (i) moves the two or more rotor blades such that each rotor blade produces a respective vortex and (ii) the respective vortices produced by the two or more rotor blades cause the rotor unit to produce the sound output having the energy distribution defined, at least in part, by the set of frequencies, wherein the set of frequencies comprises a predetermined number of frequencies. Moreover, in some embodiments, the value of the asymmetric parameter is selected such that operation of the rotor unit: (i) moves the two or more rotor blades such that each rotor blade produces a respective vortex and (ii) the respective vortices produced by the two or more rotor blades cause the rotor unit to produce the sound output having the energy distribution defined, at least in part, by the set of frequencies, wherein the set of frequencies comprises at least one frequency having a predetermined strength.

VII. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. An aerial vehicle comprising:
 a plurality of rotor units connected to the aerial vehicle, wherein at least one rotor unit of the plurality of rotor units comprises:
  two or more rotor blades, wherein each rotor blade of the two or more rotor blades comprises a surface area, and wherein an asymmetric parameter is defined, at least in part, by the relationship between the surface areas of the two or more rotor blades; and
 a control system configured to operate the at least one rotor unit, wherein the value of the asymmetric parameter is selected such that the operation of the at least one rotor unit: (i) moves the two or more rotor blades such that each rotor blade produces a respective vortex and (ii) the respective vortices produced by the two or more rotor blades cause the rotor unit to produce a sound output having an energy distribution defined, at least in part, by a set of frequencies, wherein the set of frequencies comprises a fundamental frequency, one or more harmonic frequencies of the fundamental frequency, and one or more non-harmonic frequencies of the fundamental frequency having a respective strength greater than a threshold strength.

2. The aerial vehicle of claim 1, wherein the value of the asymmetric parameter is selected such that the operation of the at least one rotor unit: (i) moves the two or more rotor blades such that each rotor blade produces a respective vortex and (ii) the respective vortices produced by the two or more rotor blades cause the rotor unit to produce the sound output having the energy distribution defined, at least in part, by the set of frequencies, wherein the set of frequencies comprises a predetermined number of frequencies.

3. The aerial vehicle of claim 1, wherein the value of the asymmetric parameter is selected such that the operation of the at least one rotor unit: (i) moves the two or more rotor blades such that each rotor blade produces a respective vortex and (ii) the respective vortices produced by the two or more rotor blades cause the rotor unit to produce the sound output having the energy distribution, defined at least in part, by the set of frequencies, wherein the set of frequencies comprises at least one frequency having a predetermined strength.

4. The aerial vehicle of claim 1, wherein the two or more rotor blades comprise: a first rotor blade comprising a first length, and
a second rotor blade comprising a second length, and wherein the asymmetric parameter is defined, at least in part, by a difference between the first length and the second length.

5. The aerial vehicle of claim 1, wherein the two or more rotor blades comprise:
a first rotor blade comprising a first width, and
a second rotor blade comprising a second width, and wherein the asymmetric parameter is defined, at least in part, by a difference between the first width and the second width.

6. The aerial vehicle of claim 1, wherein the two or more rotor blades comprise a first rotor blade and a second rotor blade, and wherein the value of the asymmetric parameter is selected such that the operation of the at least one rotor unit: (i) moves the first rotor blade such that the first rotor blade produces a first vortex, (ii) moves the second rotor blade such that the second rotor blade produces a second vortex, and (iii) the first vortex produced by the first rotor blade and the second vortex produced by the second rotor blade cause the rotor unit to produce the sound output having the energy distribution defined, at least in part, by the set of frequencies.

7. The aerial vehicle of claim 6, wherein the first vortex has a first strength, and wherein the second vortex has a second strength that is different than the first strength.

8. The aerial vehicle of claim 6, wherein the first vortex and the second vortex couple to form a third vortex, and wherein the third vortex causes the rotor unit to produce the sound output having the energy distribution defined, at least in part, by the set of frequencies.

9. The aerial vehicle of claim 8, wherein the first vortex has a first period, wherein the second vortex has a second period that is substantially the same as the first period, and wherein the third vortex has a third period that is different than the first and second periods.

10. The aerial vehicle of claim 1, wherein the plurality of rotor units comprise a first rotor unit and a second rotor unit, wherein the first rotor unit comprises:
a first rotor blade and a second rotor blade coupled to a first motor, wherein the first rotor blade comprises a first length, wherein the second rotor blade comprises a second length, and wherein a first asymmetric parameter is defined, at least in part, by the relationship between the first length and the second length, wherein the value of the first asymmetric parameter is selected such that the operation of the first rotor unit: (i) moves the first rotor blade such that the first rotor blade produces a first trailing tip vortex, (ii) moves the second rotor blade such that the second rotor blade produces a second trailing tip vortex, and (iii) the first trailing tip vortex produced by the first rotor blade and the second trailing tip vortex produced by the second rotor blade cause the first rotor unit to produce a first sound output having a first energy distribution defined, at least in part, by a first set frequencies, wherein the first set of frequencies comprises a first fundamental frequency, one or more first harmonic frequencies of the first fundamental frequency, and one or more first non-harmonic frequencies of the first fundamental frequency having a respective strength greater than the threshold strength, wherein the second rotor unit comprises:
a third rotor blade and a fourth rotor blade coupled to a second motor, wherein the third rotor blade comprises a third length, wherein the fourth rotor blade comprises a fourth length, and wherein a second asymmetric parameter is defined, at least in part, by the relationship between the third length and the fourth length, wherein the value of the second asymmetric parameter is selected such that the operation of the second rotor unit: (i) moves the third rotor blade such that the third rotor blade produces a third trailing tip vortex, (ii) moves the fourth rotor blade such that the fourth rotor blade produces a fourth trailing tip vortex, and (iii) the third trailing tip vortex produced by the third rotor blade and the fourth trailing tip vortex produced by the fourth rotor blade cause the second rotor unit to produce a second sound output having a second energy distribution defined, at least in part, by a second set frequencies, and wherein the second set of frequencies comprises a second fundamental frequency, one or more second harmonic frequencies of the second fundamental frequency, and one or more second non-harmonic frequencies of the second fundamental frequency having a respective strength greater than the threshold strength.

11. The aerial vehicle of claim 10, wherein the first asymmetric parameter is substantially the same as the second asymmetric parameter.

12. The aerial vehicle of claim 10, wherein the first asymmetric parameter is different than the second asymmetric parameter.

13. The aerial vehicle of claim 10, wherein the first set of frequencies is substantially the same as the second set of frequencies.

14. The aerial vehicle of claim 10, wherein the first set of frequencies is different than the second set of frequencies.

15. A rotor unit comprising:
a motor;
a hub coupled to the motor; and
two or more rotor blades coupled to the hub, wherein each rotor blade of the two or more rotor blades comprises a surface area, wherein an asymmetric parameter is defined, at least in part, by the relationship between the surface areas of the two or more rotor blades, wherein the value of the asymmetric parameter is selected such that operation of the rotor unit: (i) moves the two or more rotor blades such that each rotor blade produces a respective vortex and (ii) the respective vortices produced by the two or more rotor blades cause the rotor unit to produce a sound output having an energy distribution defined, at least in part, by a set of frequencies, wherein the set of frequencies comprises a fundamental frequency, one or more harmonic frequencies of the fundamental frequency, and one or more non-harmonic frequencies of the fundamental frequency having a respective strength greater than a threshold strength.

16. The rotor unit of claim 15, wherein the value of the asymmetric parameter is selected such that operation of the rotor unit: (i) moves the two or more rotor blades such that each rotor blade produces a respective trailing tip vortex and (ii) the respective trailing tip vortices produced by the two or more rotor blades cause the rotor unit to produce the sound output having the energy distribution defined, at least in part, by the set of frequencies, wherein the set of frequencies comprises a predetermined number of frequencies.

17. The rotor unit of claim 15, wherein the value of the asymmetric parameter is selected such that operation of the rotor unit: (i) moves the two or more rotor blades such that each rotor blade produces a respective trailing tip vortex and (ii) the respective trailing tip vortices produced by the two or more rotor blades cause the rotor unit to produce the sound output having the energy distribution defined, at least in part, by the set of frequencies, wherein the set of frequencies comprises at least one frequency having a predetermined strength.

18. A method comprising:
selecting a plurality of rotor units, wherein at least one rotor unit of the plurality of rotor units comprises:
two or more rotor blades, wherein each rotor blade of the two or more rotor blades comprises a surface area, and wherein an asymmetric parameter is defined, at least in part, by the relationship between the surface areas of the two or more rotor blades; and
selecting the value of the asymmetric parameter such that operation of the at least one rotor unit: (i) moves the two or more rotor blades such that each rotor blade produces a respective vortex and (ii) the respective vortices produced by the two or more rotor blades cause the rotor unit to produce a sound output having an energy distribution defined, at least in part, by a set of frequencies, wherein the set of frequencies comprises a fundamental frequency, one or more harmonic frequencies of the fundamental frequency, and one or more non-harmonic frequencies of the fundamental frequency having a respective strength greater than a threshold strength.

19. The method of claim 18, wherein the value of the asymmetric parameter is selected such that operation of the rotor unit: (i) moves the two or more rotor blades such that each rotor blade produces a respective vortex and (ii) the respective vortices produced by the two or more rotor blades cause the rotor unit to produce the sound output having the energy distribution defined, at least in part, by the set of frequencies, wherein the set of frequencies comprises a predetermined number of frequencies.

20. The method of claim 18, wherein the value of the asymmetric parameter is selected such that operation of the rotor unit: (i) moves the two or more rotor blades such that each rotor blade produces a respective vortex and (ii) the respective vortices produced by the two or more rotor blades cause the rotor unit to produce the sound output having the energy distribution defined, at least in part, by the set of frequencies, wherein the set of frequencies comprises at least one frequency having a predetermined strength.

* * * * *